United States Patent [19]
Takihiro et al.

[11] Patent Number: 6,014,382
[45] Date of Patent: Jan. 11, 2000

[54] ATM SWITCHING SYSTEM INCLUDING A SWITCHING CONTROL PORTION FOR DISTRIBUTING CALL SET-UP REQUIREMENT SIGNALS

[75] Inventors: Masatoshi Takihiro; Toshihiko Murakami, both of Fujisawa; Osamu Takada, Sagamihara; Tomihisa Nishijima, Hadano, all of Japan

[73] Assignee: Hitachi, Ltd., Tokyo, Japan

[21] Appl. No.: 08/831,242

[22] Filed: Apr. 2, 1997

[30] Foreign Application Priority Data

Apr. 4, 1996 [JP] Japan .................................... 8-082286

[51] Int. Cl.⁷ .................................................. H04L 12/56
[52] U.S. Cl. ............................................. 370/399; 370/410
[58] Field of Search ..................................... 370/395, 396, 370/397, 398, 399, 410, 389, 392

[56] References Cited

U.S. PATENT DOCUMENTS 4,956,839   9/1990  Torii et al. ............................... 370/395
5,483,525   1/1996  Song et al. ............................... 370/399
5,483,527   1/1996  Doshi et al. ............................. 370/399
5,859,846   1/1999  Kim et al. ................................ 370/395

*Primary Examiner*—Hassan Kizou
*Assistant Examiner*—Daniel Prévil
*Attorney, Agent, or Firm*—Antonelli, Terry, Stout & Kraus, LLP

[57] ABSTRACT

An ATM switching system provided with a plurality of call processing devices, a plurality of line interfaces for inputting and outputting an ATM cell, an ATM switch connected to the plurality of line interfaces for switching the ATM cell, and a switch control portion connected to the ATM switch, the plurality of line interfaces and a plurality of call processing devices. Requirement information related to call processing input from line interfaces is collected once in the switch control portion. The switch control portion determines to which of the plurality of call processing devices the requirement information is to be distributed based on the information related to the input-output line, a state of processing capability of the call processing device, etc. The related line interface is set directly from switch control portion through a bus based on the control information from determined one or a plurality of call processing devices.

42 Claims, 37 Drawing Sheets

ATM CELL RECEPTION PROCESSING FLOW

ATM CELL TRANSMISSION PROCESSING FLOW

FIG. 4A
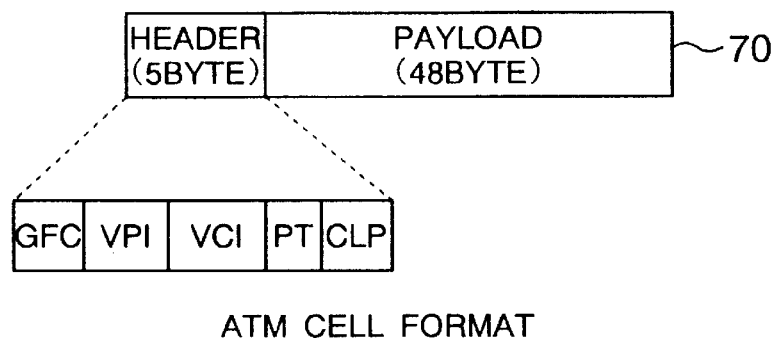
ATM CELL FORMAT
FIG. 4B
INTERNAL CELL FORMAT
FIG. 5
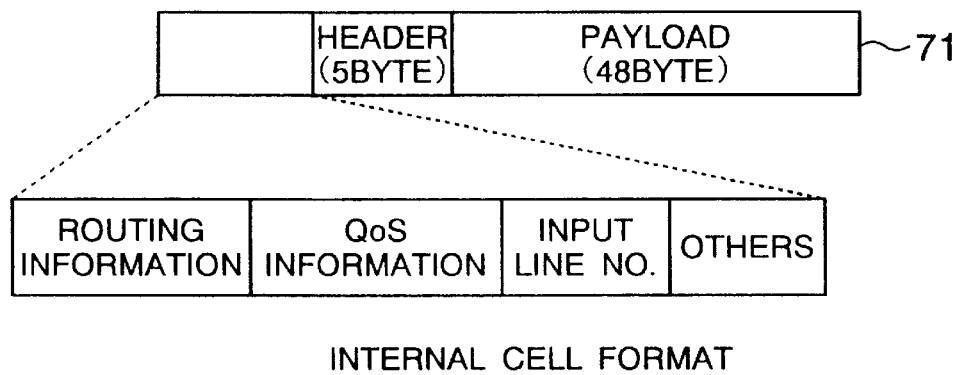

- RECEIVE INTERNAL CELL ~601
- EXTRACT INPUT LINE NO. ~602
- ACQUIRE LINE GROUP NO. ~603
- FORM CALL CONTROL MESSAGE ~604
- TRANSMIT TO CORRESPONDING CALL PROCESSING DEVICE ~605
- END

| INPUT LINE NO. | LINE GROUP NO. | CALL PROCESSING DEVICE |
|---|---|---|
| 1 | 1 | 3a |
| 2 | 1 | 3a |
| 3 | 1 | 3a |
| 4 | 2 | 3b |
| ⋮ | ⋮ | ⋮ |

| HEADER | MESSAGE TYPE | INPUT / OUTPUT LINE NO. | SSCOP PDU |
|---|---|---|---|

72

SIGNALLING INFORMATION

FIG. 10

| HEADER | MESSAGE TYPE | REQUEST REPLY | INPUT LINE NO. | INPUT-OUTPUT VPI / VCI | OUTPUT LINE NO. | INPUT / OUTPUT VPI / VCI | ADDED INFORMATION (QoS ETC.) |
|---|---|---|---|---|---|---|---|

73

SWITCH CONTROL MESSAGE

FIG. 11

| HEADER | MESSAGE TYPE | LINE NO. | LINE GROUP NO. | CALL PROCESSING DEVICE NO. |
|---|---|---|---|---|

74

LINE GROUP ADMINISTRATION MESSAGE

FIG. 12

| HEADER | MESSAGE TYPE | REQUEST / REPLY | OUTPUT LINE NO. | CALL ATTRIBUTE INFORMATION (CALLING SYSTEM, CALLED SYSTEM ADDRESS, QoS, ETC.) |
|---|---|---|---|---|

75

CALL SET-UP CONTINUATION MESSAGE

FIG. 15

| | | 326 |
|---|---|---|
| CALL NUMBER | #1 | |
| CALLING SYSTEM, CALLED SYSTEM ADDRESS | x.x.x.x.x.x.x.x.x.x.x.x.x.x.x.x.x.x.x.x | |
| | y.y.y.y.y.y.y.y.y.y.y.y.y.y.y.y.y.y.y.y | |
| INPUT-OUTPUT ATM LINE NUMBER | #1 | |
| | #2 | |
| TRANSIT ATM LINE NUMBER | | |
| ATTRIBUTE INFORMATION | QoS TYPE | 0 |
| | ⋮ | |

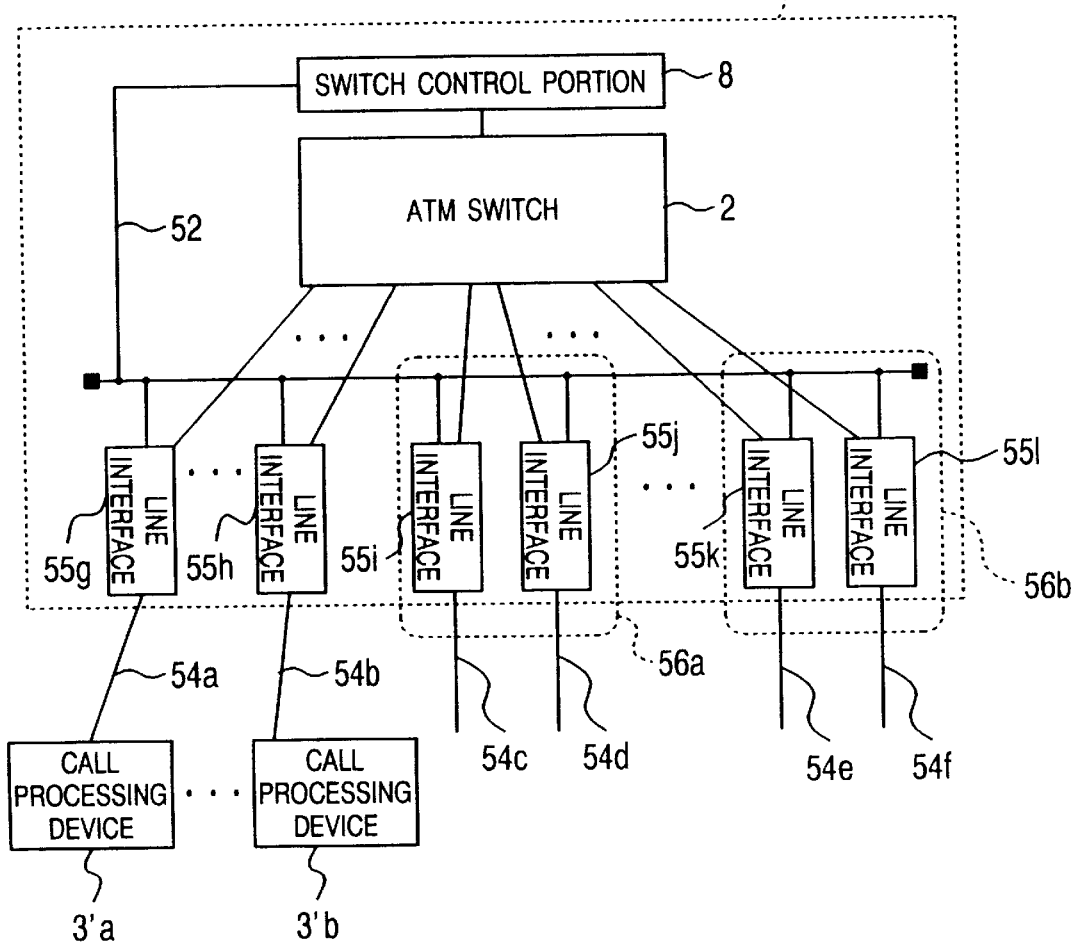

FIG. 30

| VPI / VCI VALUE | BIND OBJECT |
|---|---|
| i / j | SIGNALLING STACK 31a |
| m / n | SIGNALLING STACK 31b |
| o / p | CALL ADMINISTRATION PORTION (VIRTUAL CHANNEL FOR SWITCH CONTROL MESSAGE COMMUNICATION) |
| q / r | CALL ADMINISTRATION PORTION (VIRTUAL CHANNEL FOR CALL PROCESSING CONTINUATION MESSAGE COMMUNICATION) |
| ⋮ | ⋮ |

| VPI / VCI VALUE | OUTPUT LINE | NEW VPI / VCI VALUE | ADDED INFORMATION (QoS INFORMATION, OWN LINE NUMBER, ETC) |
|---|---|---|---|
| i / j (FROM 571') | #3 | 0 / 5 | CLASS 1, · · · , #1 |
| m / n | #4 | 0 / 5 | CLASS 1, · · · , #1 |
| o / p | #0 | o' / p' | CLASS 0, · · · , #1 |
| q / r | #2 | q' / r' | CLASS 0, · · · , #1 |
| ⋮ | ⋮ | ⋮ | ⋮ |

571"

ATM SWITCHING SYSTEM INCLUDING A SWITCHING CONTROL PORTION FOR DISTRIBUTING CALL SET-UP REQUIREMENT SIGNALS

BACKGROUND OF THE INVENTION

The present invention relates to a structure of an ATM switching system used in a network performing communication in an asynchronous transfer mode (hereinafter referred to as an ATM).

A conventional ATM switching system (referred to also as an ATM exchange or an ATM switch) had generally a structure in which one call processing device (processor) is provided in an ATM switching system, and call processing such as protocol processing of a signaling message which is call processing requirement, routing selection, switch control and administration of calls is performed based on the control of the call processing device. Furthermore, when a large scale switching system is constructed, an ATM switching system of what is called a multiprocessor type in which call processing devices are provided in a plurality of units in such a way that the structure of the system is divided and increased in accordance with the function and the load of call processing or a plurality of systems are added so as to cope with the increase of call processing is constructed in general. For example, an ATM switching system such as disclosed in JP-A-7-235928 may be given. According to this ATM switching system, an ATM switching system provided with a plurality of call processors and having large processing capacity by respective processors performing call processing of lines allocated out of a plurality of lines accommodated in the ATM switching system and processed with switching, thereby to disperse the load of call processing, is realized.

However, the allocation of lines to the call processors when the system is used practically is fixed. Therefore, in case a fault is generated in one call processor, the lines allocated to the call processor become unusable. Further, dynamic load sharing by allocating lines to the call processor with the fluctuation of the load required for call processing during operation is not performed. Furthermore, it is structured so that the allocation of line interfaces to the call processing devices can be altered by means of software by transmitting and receiving a control message between a call processor and respective line interfaces through a virtual channel of an ATM switch which can be altered by software. However, restructure from cells into control messages becomes necessary in the line interface portion, and the structure of the line interfaces becomes complicated.

As described above, the development of an ATM communication network, in particular the development of an ATM switching system, has been commenced from providing a system of a larger scale or aiming at high processing capacity. However, the scope of introduction of ATM communication has been expanded rapidly in recent years and is going to be applied to small scale multipliers (MUX) and LANs used at locations near terminals of subscribers. Moreover, since the data to be processed by those communication apparatus are various, variety of call processing configurations have become required. Namely, it is desirable to provide not only an ATM switching system aiming at a large scale, but also an ATM switching system having a structure which is applicable from small scale to large scale ATM switching systems. Moreover it is described to have a structure capable of diverse call processing so that various communication services can be offered to various users.

SUMMARY OF THE INVENTION

The present invention was developed in light of the above-mentioned circumstances and requirements, and has for its object to provide an ATM switching system capable of including a call processing function that can cope with the requirements from network systems having a variety of structures flexibly.

Specifically, the object of the present invention includes:

(1) to provide an ATM switching system capable of realizing call processing in which a high throughput is obtained by performing distribution of call processing requirements suitable for the structure of the network system among a plurality of call processing devices forming the ATM switching system;

(2) to provide an ATM switching system capable of continuing call processing against a fault generated in a certain call processing device among a plurality of call processing devices by switching call processing that has been distributed to that call processing device to another call processing device;

(3) to provide an ATM switching system capable of continuing call processing, in case an overload is produced in a certain call processing device among a plurality of call processing devices, by switching the call processing that has been distributed in that call processing device to another call processing device; and (4) to provide an ATM switching system capable of altering, dispersing and adding the function and the load of call processing easily so that expansion to network systems of various scales is possible.

Furthermore, the object of the present invention also includes:

(5) to provide line interfaces, a switch control portion and a call processing device of an ATM switching system suitable for realizing the above-mentioned ATM switching system with a simple structure and also to provide control methods thereof.

In order to achieve the above-mentioned object, an ATM switching system of the present invention is structured so that a call processor (or a call processing device) is provided on the backside (or in the latter part) of the ATM switch for the line interface, a switch control portion is provided between the call processing device and the ATM switch, and requirement information related to call processing is distributed in the switch control portion. Further, input-output lines are grouped into at least one line group so as to administrate the call processing in the unit of group, and call processing is performed with a call processing device corresponding to each line group.

When line interfaces are controlled, control information from call processing devices is collected once in a switch control portion, and the line interfaces are controlled directly through a bus connecting the switch control portion with all the line interfaces, thereby to simplify the structure of the line interfaces and aim at reduction in cost.

Furthermore, it has been arranged so that allocation of the line interfaces and the call processing device may be altered by means of the software of the switch control portion, a straddle rule of requirement information related to call processing is altered in accordance with the load state or the state of fault of the call processing device, sharing of the load of the call processing device is realized, and it is arranged so that call processing of the call processing device where the fault has occurred may be executed with another call processing device.

More particularly, an ATM switching system has been structured of a plurality of call processing devices, an ATM switch for switching cells with a plurality of line interfaces for inputting/outputting ATM cells, and a switch control portion for transmitting requirement information related to call processing input from the line interfaces to the call processing device and controlling the switch based on control information from the call processing device. The ATM switching system is structured so that a plurality of line interfaces and the switch control portion are connected so as to transmit and receive information, and the switch control portion is provided with a distribution portion for distributing requirement information to any of a plurality of call processing devices. Call processing of the ATM cells input and output through a plurality of line interfaces is executed in any call processing device among a plurality of call processing devices determined by the distribution portion.

As the distribution system of call processing requirement, a structure that the call processing requirement is distributed among the call processing devices connected directly to the ATM line using a virtual channel may be adopted.

Furthermore, respective ATM lines are structured so that they are grouped into line groups each consisting of one line or more of ATM lines, and the call processing requirement transmitted and received by the ATM line is distributed among a plurality of call processing devices in the unit of line group by means of the switch control portion. Further, the call processing device is structured so that the administration of the set call information is also performed individually in the unit line group. Namely, it has been structured so that each line group is administrated as one virtual ATM switching device.

With this, it is possible to increase independency of call processing of each line group, and, when a fault is generated in a certain call processing device, the fault does not only extend to another call processing device, but also the call processing by the call processing device where the fault has been generated can be taken over easily by the call processing device which holds a duplicate by holding the duplicate of call administrative information with another call processing device. Further, dynamic load sharing becomes possible by altering allocation of the line groups and the call processing device at the time of operation.

According to the present invention, it is structured so that the call processing for each group is performed using original messages taking the overhead of call processing into consideration. It is also possible to perform call processing extending over line groups using call processing procedures among normal ATM switching devices with the line group as one ATM switching device.

Further, each call processing device is structured so that control of an optional ATM switching device may be made by providing a communication portion with the switch control portion of each ATM switching device.

According to the present invention, it is structured so that one or a plurality of ATM lines are set as one line group collectively with one ATM line as a unit, and individual call processing device is allocated to each line group, and so that switching (or taking over) of the load and the function and sharing of the load suitable for the structure of the network system may be performed. For example, the structure is such that an exclusive call processing device can be allocated to an ATM line where concentration of call processing requirements connected with a server or the like is forecast.

Further, an ATM switching system which can continue call processing without exerting influence upon other than call information which becomes an object even when a fault is generated by such a structure that administration of call information is performed individually in the unit of line group and call information which becomes an object is duplicated in another call processing device.

Furthermore, each call processing device is structured so that an ATM switching system may be provided by an optional quantity of call processing devices and an optional quantity of ATM switching devices by including a communication portion with the switch control portion of each ATM switching device. In this structure, an economical system in which one call processing device executes call processing of all of the ATM switching devices for a network system having principally a permanent virtual channel (PVC) in which no call processing requirement is produced.

According to an ATM switching system of the present invention, it is possible to divide optional line numbers of ATM lines into groups, and to distribute signaling messages (call processing requirement) transmitted and received by a VC for signaling on the ATM lines among one or more call processing devices in the unit of each group. Therefore, it is possible to obtain high throughput by performing sharing of call processing taking the structure of the ATM network system into consideration. For example, it is possible to allocate an exclusive call processing device (processor) for an ATM line where it is conjectured that call processing requirement will be generated frequently in a server or the like.

Further, since a switch control portion or a VC having a distribution function of signaling messages is used for the distribution of signaling messages, the destination of distribution can be altered dynamically, and it is possible to switch a call processing device at the time of fault and to regulate load balance (dynamic load sharing) among call processing devices using the switch control and the VC.

Since administrative information such as a state of each protocol stack related to call processing and administrative information of calls are administrated in the unit of each line group, it is possible to work out a countermeasure to cope with a fault and perform dynamic load sharing without altering the administrative information in a call processing device which becomes an object of operation in the above-mentioned countermeasure against a fault and dynamic load sharing by performing duplication of information and switching of the call processing device in the unit of line group.

Since each call processing device includes a communication device with the switch control portion of each ATM switching device, one call processing device can control two ATM switching devices directly without going through normal call setting procedures for setting the VC in the ATM lines connecting among ATM switching devices even in the case of call setting over a plurality of ATM switching devices. With this, it is possible to perform call processing at high speed over a plurality of ATM switching devices. Further, since it is also possible to perform call processing of ATM switching devices in the quantity more than the call processing devices, an economical ATM switching system can be structured.

BRIEF DESCRIPTION OF THE DRAWINGS

FIGS. 4A and 4B are format diagrams showing the structures of an ATM cell and an internal cell;

FIG. 5 is a table diagram showing a structure of a VC routing table;

FIG. 9 is a frame diagram showing a structure of signaling information;

FIG. 10 is a frame diagram showing a structure of a switch control message;

FIG. 11 is a frame diagram showing a structure of a line group administration message;

FIG. 12 is a frame diagram showing a structure of a call set-up continuation message;

FIG. 15 is a table diagram showing a structure of a call administration table;

FIG. 27 is a block diagram showing another structure of an ATM switching system according to the present invention;

FIG. 28 is a table diagram showing a structure of a routing table;

FIG. 30 is a table diagram showing a structure of a connection administration table;

FIG. 31 is a table diagram showing a structure of a VC routing table;

DESCRIPTION OF THE PREFERRED EMBODIMENTS

Embodiments of an ATM switching system according to the present invention will be described in detail hereinafter with reference to the drawings.

<The First Embodiment>

Figure 1:
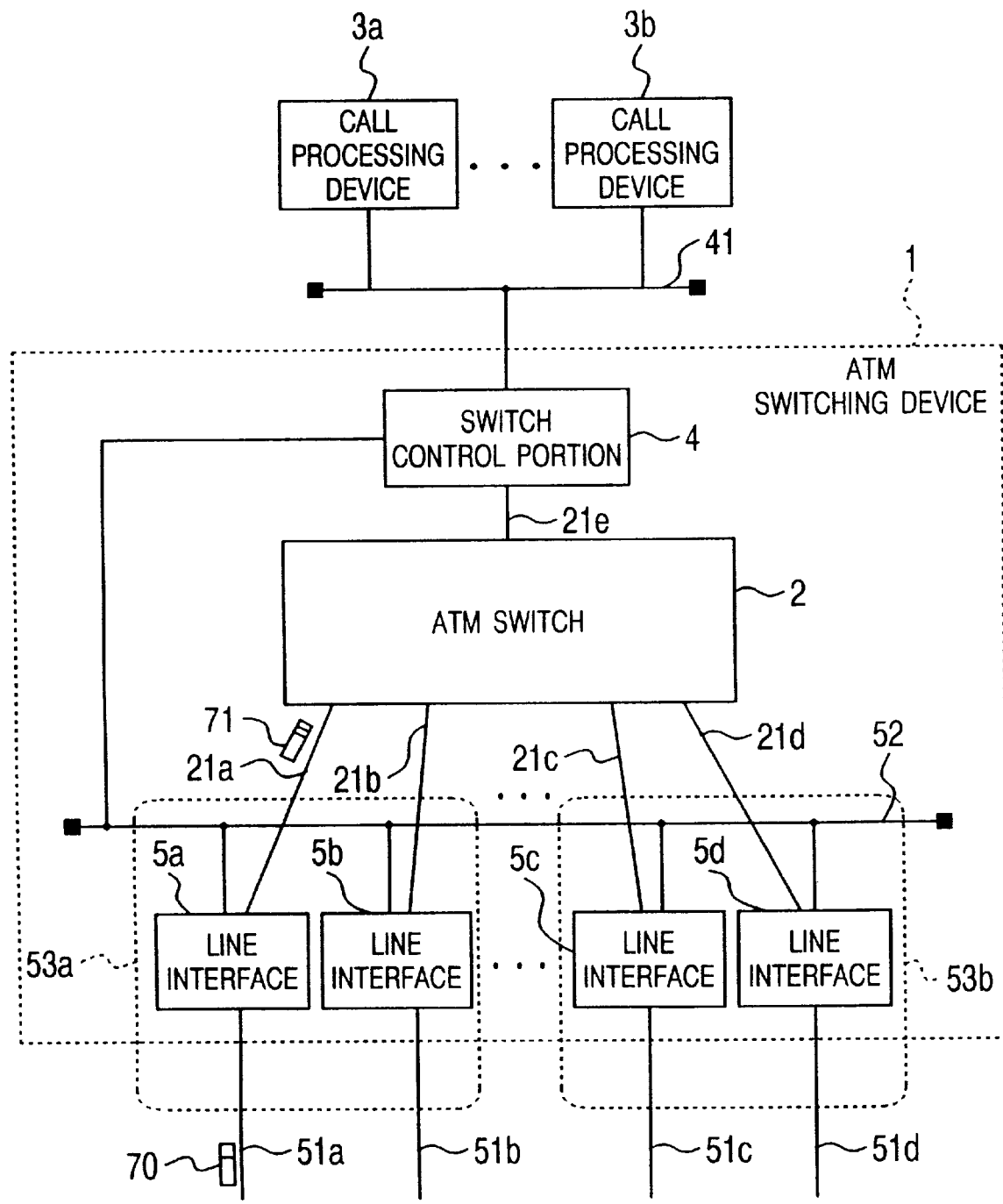
FIG. 1 is a block diagram showing a structure of an ATM switching system according to the present invention.

FIG. 1 is a block diagram showing a structure of an ATM switching system according to the present invention. In FIG. 1, the ATM switching system of the present invention include an ATM switching device 1 and an optional number of call processing devices 3 (3a to 3b). Here, the ATM switching device 1 is provided with a speech path portion including an ATM switch 2 having internal input-output lines 21a to 21d and line interfaces 5 (5a to 5d) for connecting internal input-output lines 21a to 21d with ATM lines 51a to 51d. The line interfaces 5a to 5d perform conversion between communication media of the ATM lines and communication media of internal input-output lines and conversion between an ATM cell 70 on the ATM line and an internal cell 71 which has added routing information or the like to the ATM cell. The ATM switching device 1 also includes a switch control portion 4 connected to the ATM switch 2 with an internal input-output line 21e. The switch control portion 4 is structured so that the switch control portion 4 is connected to the line interfaces 5 (5a to 5d) with a bus 52 for line interface control, and the switch control portion 4 controls the line interfaces through the bus 52. Further, the call processing devices 3 (3a to 3b) are connected to the switch control portion 4 with a call control message communication line 41. In FIG. 1, although a bus form communication line represented by ETHERNET is shown as the call control message communication line 41, the communication line 41 may be structured with a communication medium of the other configurations. Further, the call processing devices 3 (3a to 3b) may also be included in the ATM switching device 1 with the call control message communication line 41 as an internal bus of the ATM switching device 1.

53a and 53b constitute one line group, respectively, and each of them is regarded as a virtual ATM switching device and administrated and controlled.

Figure 41:
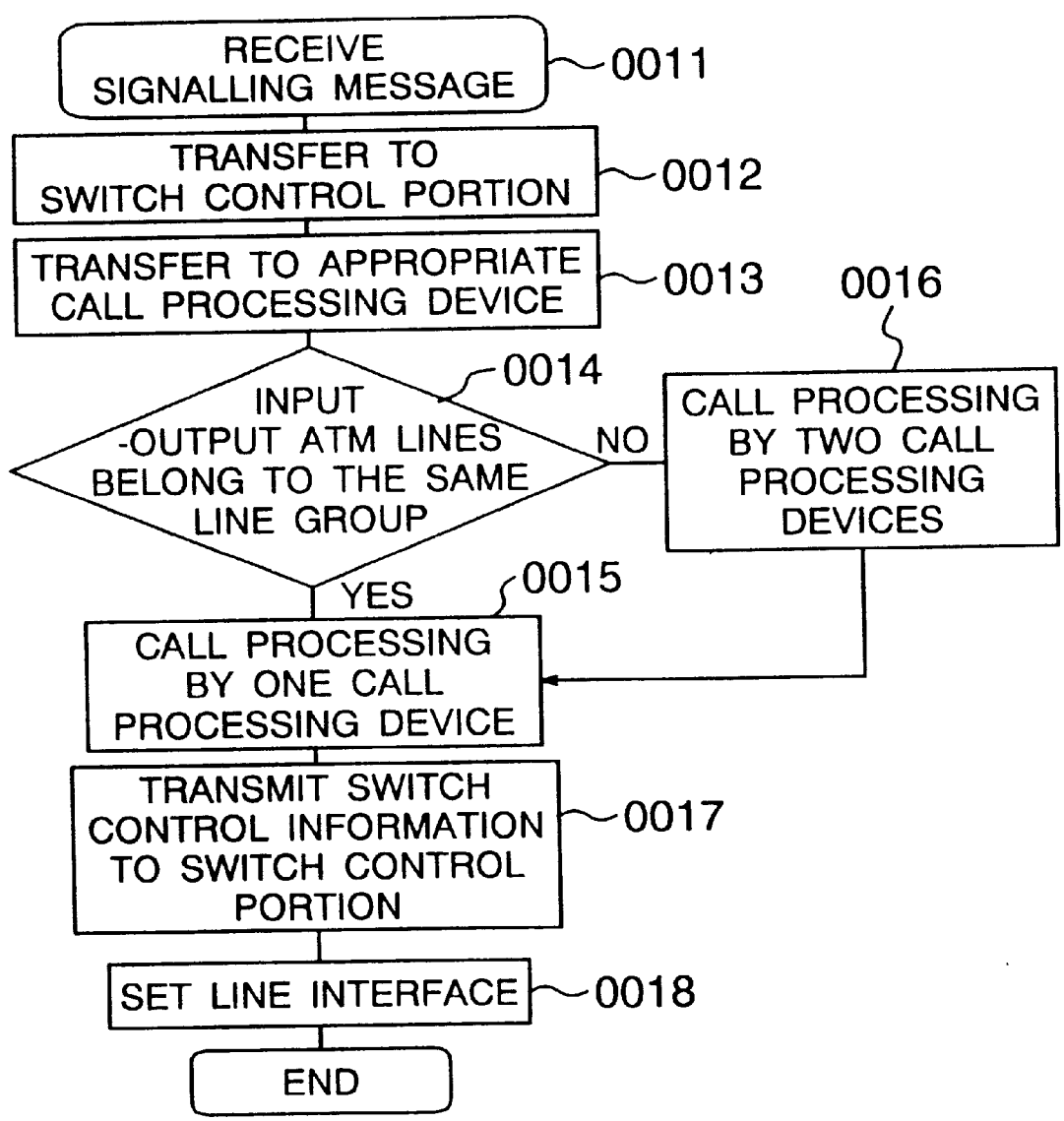
FIG. 41 is a chart showing a processing flow of the ATM switching system shown in FIG. 1.

FIG. 41 shows a chart showing a rough sequence of call processing at a system level in the present embodiment. A signaling message which arrived at a line interface from the ATM line (0011) is transferred to the switch control portion through an ATM switch (0012). In the switch control portion, a signaling message is transferred to an appropriate call processing device through the switch control message communication line in accordance with group administrative information (0013). In the call processing device, when the input ATM line and the output ATM line belong to the same line group, the corresponding call processing device performs processing independently of the other call processing devices (0014, 0015). When the input ATM line and the output ATM line belong to different line groups, the call processing device performs processing in cooperation with another call processing device to which a line group to which the output ATM line belongs is allocated (0014, 0016). Then, a switch control message is transmitted to the switch control portion through the switch control message communication line (0017), and the VC is set by the switch control portion setting a VC routing table of a line interface through a bus based on the switch control message (0018).

Next, the structure and the processing sequence of respective processing portions will be described in detail.

Figure 2:
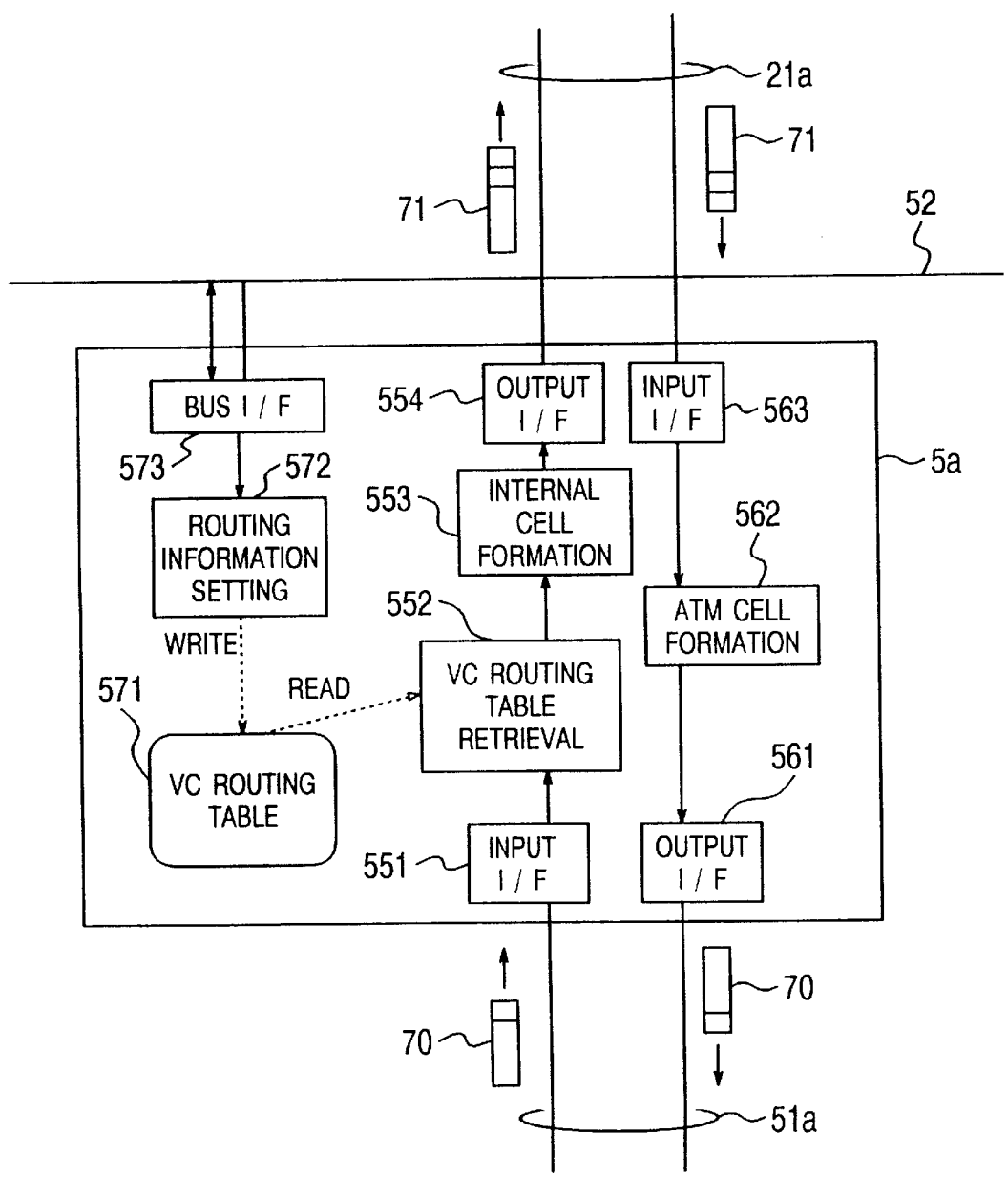
FIG. 2 is a block diagram showing a structure of a line interface.
Figure 3A:
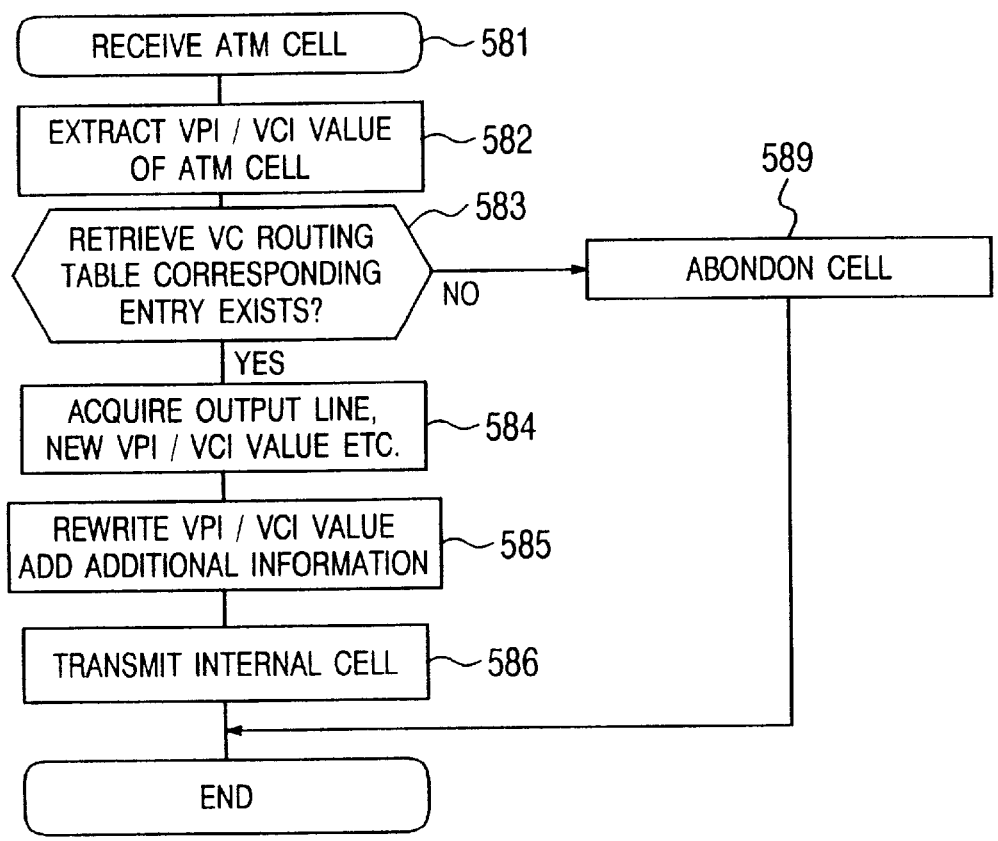
FIGS. 3A and 3B are processing flow charts showing the operation of the line interface.
Figure 3B:
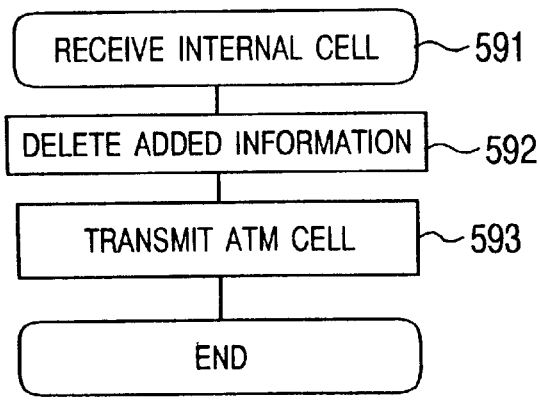

FIG. 2 is a block diagram showing a structure of the line interface 5, FIGS. 3A and 3B are processing flow charts showing the operation of the line interface 5, and FIGS. 4A and 4B are format diagrams showing formats of an ATM cell and an internal cell handled in the ATM switching system. Besides, a line interface 5a has been shown as an example in FIG. 2, but the same processing is also performed with the same structure in the other line interfaces 5b to 5d. Further, an ATM line 51a and an internal input-output line 21a are shown while being divided into two lines, for input and for output, respectively. FIG. 5 is a table diagram showing a structure of a routing table 571 for showing destinations of cells provided in the line interfaces 5. The operation of an ATM switching system according to the present invention will be described hereinafter with reference to these drawings.

First, routing of an ATM cell (since the switching operation of cells in such an ATM switching system is performed in the unit of the Virtual Channel, it is referred to as the VC routing hereinafter) will be described taking a case when an ATM cell 70 which has arrived at an ATM line 51a is switched by the ATM switch 2 and transmitted from an ATM line 51b as an example.

The line interface 5 receives an ATM cell 70 shown in FIG. 4A from the ATM line 51a through an input I/F 551 (581). In a VC routing table retrieval portion 552, a VPI/VCI value which is an identifier of a cell is extracted from a header portion of the received ATM cell 70 (582), and a VC routing table 571 shown in FIG. 5 is retrieved from this VPI/VCI value, thereby to obtain additional information such as a destination input-output line number of the ATM cell 70, a new VPI/VCI value and Quality of Service (QoS) information (583, 584). When no entry related to this VPI/VCI value is made in the VC routing table 571, however, the received cell is abandoned (589). In an internal cell forming portion 553, the VPI/VCI value in the ATM cell header is rewritten to a new VPI/VCI value by the value of the VC routing table 571, an internal cell 71 shown in FIG. 4B obtained by adding information such as routing information, QoS information and input line numbers to an ATM cell is formed (585), and thereafter, the internal cell 71 is sent to the internal input-output line 21a through an output I/F 554. The ATM switch portion 2 performs VC routing using this added information, and sends the internal cell 71 to the internal input-output line 21b which is a destination input-output line. When explanation is made regarding 5a and 51a shown in FIG. 2 as 5b and 51b, the line interface 5b receives the internal cell 71 through the input I/F 563 (591), deletes added information in an ATM cell generating portion 562 thereafter (592) and sends the ATM cell 70 to the ATM line 51b through the output I/F portion 561 (593).

Next, call processing in an ATM switching system according to the present invention will be described. The communication in an ATM switching network is generally performed by setting a VC among (a terminal which becomes a communication path) to (one or more ATM switching systems) to (terminals) and transmitting an ATM cell therethrough. The set-up and release of the VC are performed by switching message frames (hereinafter referred to as signaling messages) such as SETUP and RELEASE requiring set-up and release of a VC among terminals to the ATM switching system to terminals using a signaling VC in which the value of the identifier VPI/VCI of the cell is 0.5. In a word, signaling messages are transmitted by being divided into ATM cells having the value of VPI/VCI of 0.5. The processing performed by an ATM switching system which has received the signaling message for the purpose of setting or releasing the VC is referred to as call processing. In the ATM switching system of the present invention, one or more call processing devices connected to the switch control portion 4 are provided (FIGS. 3A and 3B), and these call processing devices perform call processing with diffusion, thereby making it possible to improve call processing throughput. The call processing operation will be described hereinafter taking an ATM switching system having two call processing devices 3a and 3b as an example.

The call processing of an ATM switching system of the present invention forms ATM lines into groups and performs call processing in the unit of each group. For example, the ATM lines 51a and 51b are formed as the line group 53a, and the ATM lines 51c and 51d are formed as the line group 53b, and the call processing related to the line group 53a, that is, the processing of signaling messages received or transmitted by the ATM line 51a or 51b is allocated to the call processing device 3a, and the call processing related to the line group 53b, that is, the processing of signaling messages received or transmitted by the ATM line 51c or 51d is allocated to the call processing device 3b, thereby to perform load sharing of call processing of the ATM switching system.

The call processing in the ATM switching system according to the present invention will be described hereinafter by dividing into two cases, (1) when an ATM line on a calling system side (hereinafter referred to as an input ATM line) and an ATM line on a called system side (hereinafter referred to as an output ATM line) belong to the same line group and (2) when they belong to different line groups.

(1) Call processing when the input line and the output line of a VC belong to the same line group The present case shows call processing when the ATM line 51a and the ATM line 51b which belong to the same line group become an input ATM line and an output ATM line, respectively.

Since the signaling message arriving at the line interface 5a from the ATM line 51a is transmitted using a signaling VC having a value of VPI/VCI at 0/5, the ATM cell is VC-routed to an internal input-output line #0 21e connected to the switch control portion 4 through the ATM switch 2 (following to a first entry) after the ATM cell forming signaling messages by the VC routing table 571 of a format shown in FIG. 5 at respective line interfaces 5a to 5d (the entry value shows an example of the line interface portion 5a of the ATM line number #1) is converted into an internal cell.

Further, the signaling message which has arrived at the line interface can also be transmitted directly to the switch control portion through a line interface controlling bus without being transmitted through an ATM switch.

Figure 6:
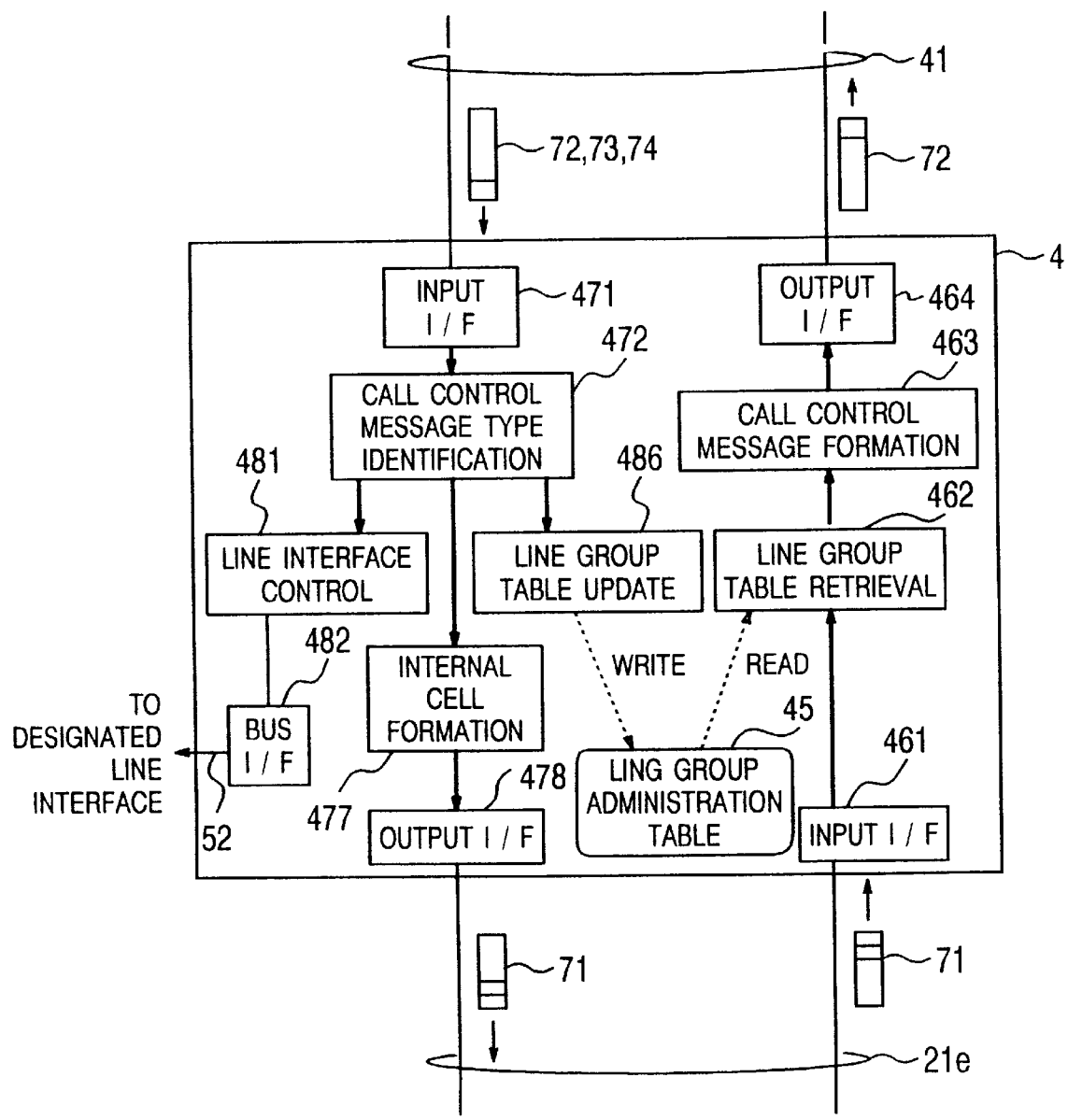
FIG. 6 is a block diagram showing a structure of a switch control portion.
Figures 7, 8:
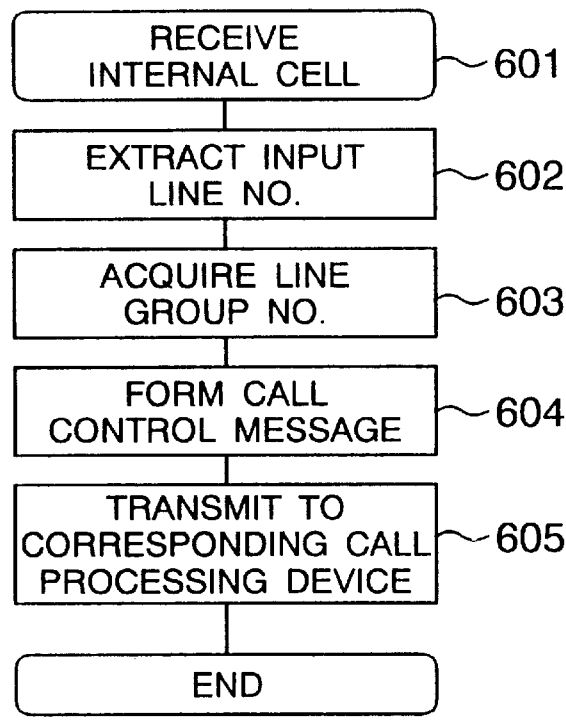
FIG. 7 is a processing flow chart showing the operation of the switch control portion.
FIG. 8 is a table diagram showing a structure of a line group administration table.

FIG. 6 is a block diagram showing the structure of the switch control portion 4. In FIG. 6, each of an internal input-output line 21e and a call control message communication line 41 is shown while dividing into two lines for input and for output similarly to FIG. 2. Further, FIG. 7 is a processing flow chart showing the operation of the switch control portion 4, and shows processing since after the internal cell 71 is received from the internal input-output line 21e until a call control message including signaling information to the call control message communication line 41 (hereinafter referred to as signaling information 72 described later) is transmitted. Furthermore, FIG. 8 is a table diagram showing a structure of a line group administration table 45 showing "which call processing group the line belongs to" provided in the switch control portion 4, and FIG. 9 to FIG. 12 are frame diagrams showing structures of the signaling messages, and show frame structures of signaling information 72, a switch control message 73, a line group administration message 74 and a call set-up continuation message 75, respectively.

The operation of the switch control portion 4 will be described hereinafter with reference to those drawings. The switch control portion 4 receives the internal cell 71 from the internal input-output line 21e through an input I/F 461 (601). In a line group table retrieval portion 462, an input line number of added information of the internal cell is extracted (602), and a line group number to which the ATM line belongs is obtained by retrieving the line group administration table 45 shown in FIG. 8 (603). According to the present invention, it is possible to easily obtain a line group to which the line belongs and a corresponding call processing device from the line number by using the line group administration table 45. FIG. 8 shows an example in which, for example, the ATM lines 1 to 3 belong to a line group 1, the ATM line 4 belongs to the line group 2, and line groups 1 and 2 correspond to the call processing devices 3a and 3b, respectively. Next, in a call control message forming portion 463, when added information is deleted from the internal cell 71 and the call control message 72 depending on the call control message communication line is formed (604), the call control message 72 is transmitted to the corresponding call processing device (the call processing device 3a here) by the call control message communication line 41 through an output I/F 464 (605). Besides, the call control message mentioned in the above description is the signaling information 72 shown in FIG. 9, and is composed of a payload portion including a signaling message (shown with SSCOP PDU), an input/output line number and a frame type identifier, and a header portion depending on the communication line including a destination call processing device (which is 3a to which the processing related to a signaling message received from a line group 53a has been allocated) identifier or the like.

Next, processing in the call processing device 3 will be described.

Figure 13:
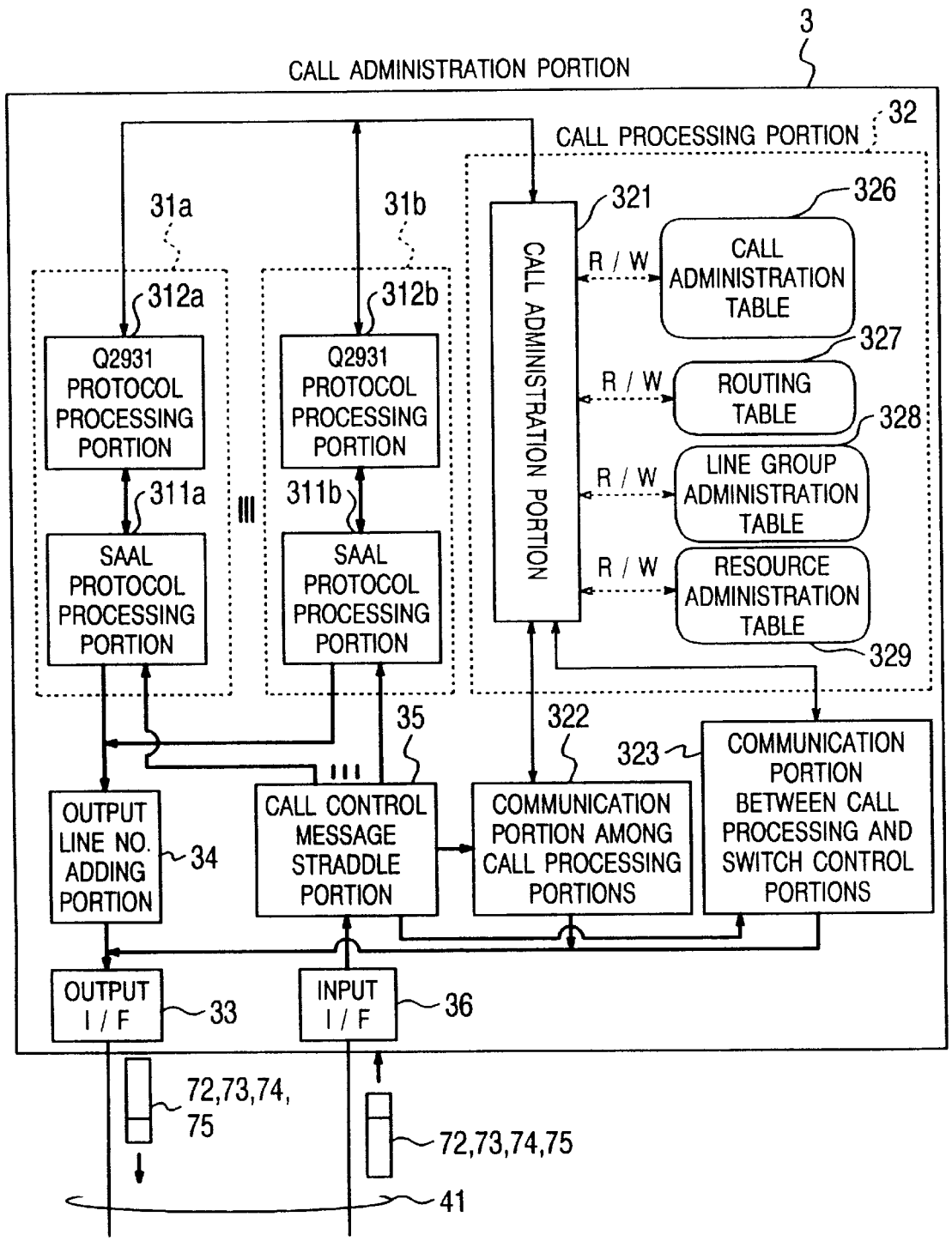
FIG. 13 is a block diagram showing a structure of a call processing device of an ATM switching system according to the present invention.
Figure 14:
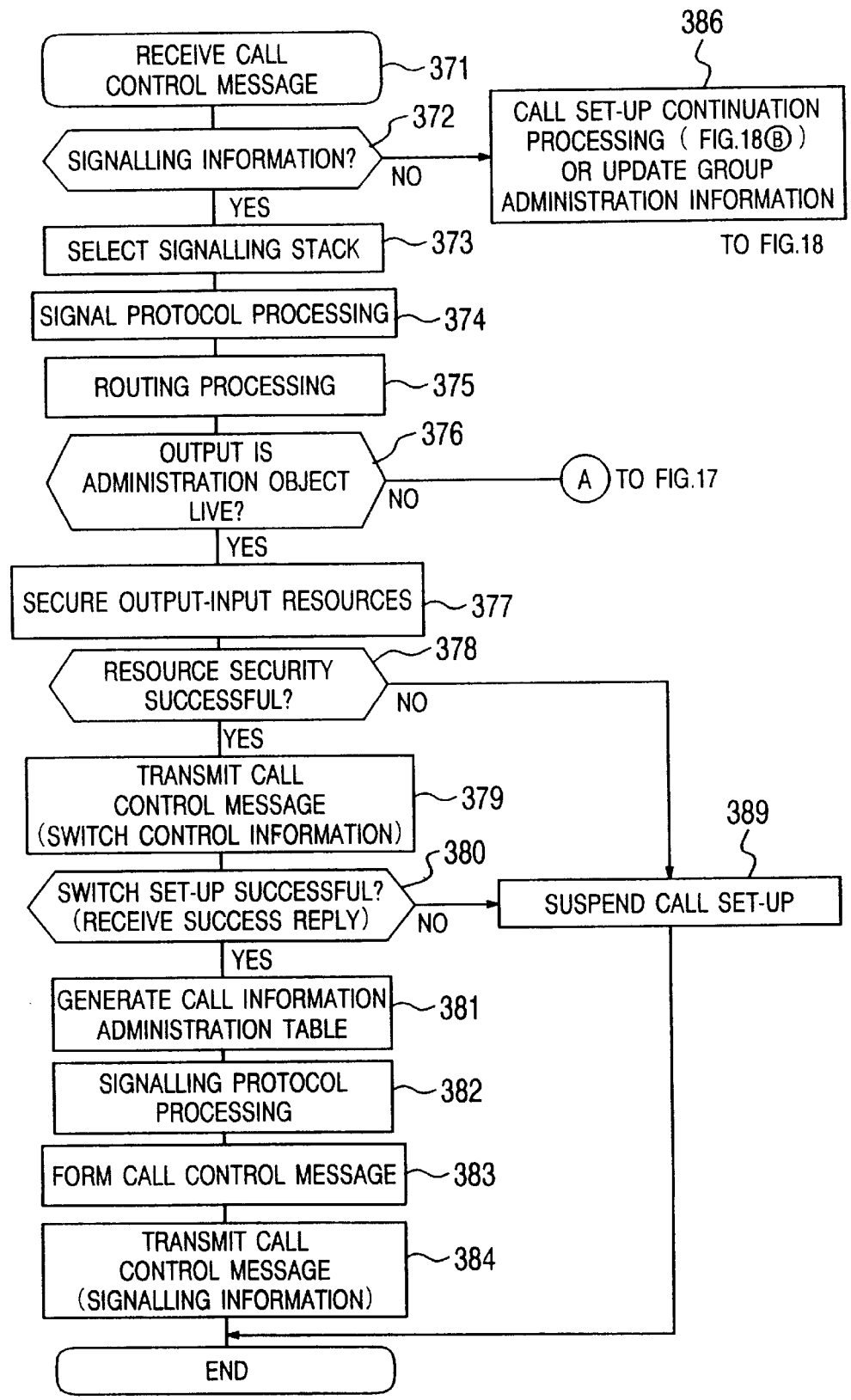
FIG. 14 is a processing flow chart showing the operation of a call processing device.

FIG. 13 is a block diagram showing a structure of the call processing device. The call processing device 3 has a processor for performing call set-up processing, and respective functional blocks shown in FIG. 13 are realized by the processor (not shown) executing by means of a software. The FIG. 13 also shows the call control message communication line 41 while dividing it into two lines, for input and for output. FIG. 14 is a processing flow chart showing the operation of the call processing device 3, and shows the call processing operation when the signaling information has been received.

The operation of the call processing device 3 will be described hereinafter. A call control message straddling portion 35 identifies the message type, when a call control message is received through an input I/F 36 (371), by means of a message type value included in the payload portion thereof (372). Since the call control message is the signaling information 72 shown in FIG. 9 in the present description, when an input line number is extracted, a signaling message is delivered to a signaling stack designated correspondingly to the VC for signaling (373) so as to perform signaling protocol processing. To be concrete, a signaling stack 31a corresponding to the VC for signaling of an ATM line 51a (the value of VPI/VCI is 0/5) is allocated, and signaling protocol processing is performed by means of a SAAL protocol processing portion 311a and a Q.2931 protocol processing portion 312a for performing SSCOP protocol processing and SSCF protocol processing of the signaling stack 31a (374). The signaling stack 31a informs to a call administration portion 321 of requirements for VC setting.

The call administration portion 321 exists one for a line group as shown in FIG. 13, and includes a call administration table 326 having call administration information related to a line group in charge, a routing table 327 having route selecting information for obtaining an ATM line which is an output from an ATM address of a destination terminal, a resource administration table 329 for administrating resources (a vacant band, VPI/VCI value and so on) of a line group in charge, and a line group administration table 328 (the contents are the same as the line group administration table 45 shown in FIG. 8). In the call administration portion 321, an ATM line which is an output accumulated in the routing table 327 is determined from the destination ATM address included in setting requirement of the VC (375), and an ATM line 51b is selected. Further, since it is understood from the line group administration table 328 that the ATM line 51b is an objective line group of the call administration portion (376), the control of the ATM switch 2 is performed as described hereunder.

First, resources of an input ATM line and an output ATM line are secured using a resource administration table 329 (377). When security of resources is successful (378), a call control message (hereinafter referred to as a switch control message 73) including switch control information (line interface control information) shown in FIG. 10 is transmitted to the switch control portion 4 through a communication portion between call processing and switch control portions 323 (379).

FIG. 15 is a table diagram showing a structure of the call administration table 326. The call administration portion 321 which has received switch setting success notice (380) from the switch control portion 4 after resources are secured forms the call administration table 326 related to the set call shown in FIG. 15 (381). In this call administration table 326, ATM addresses of a calling system and a called system, an input-output ATM line number for setting the VC, and attribute information (such as QoS information) and so on are recorded. Besides, an ATM transit trunk number becomes necessary when an ATM switching system with a plurality of ATM switching devices and a plurality of call processing devices described later is structured. When security of resources or switch setting is unsuccessful (378, 380), a switch control mechanism erases all of the settings related to the call midway of setting and sustains call processing (389).

When the setting of the VC is completed normally with the operation described above, the call administration portion 321 requires the signaling stack (such as 31b) corresponding to the output ATM line 51b to issue a signaling message for notifying an ATM switching system (or terminal) of continuation of call setting, and requires the signaling stack 31a corresponding to the input ATM line 51a to issue a signaling message for notifying an input ATM switching system (or terminal) of switch set-up continuation. The signaling message generated by the signaling stacks 31a and 31b (382) is formed into a call control message added with an identifier showing a message type and an output line as shown in FIG. 9 (383), which is transmitted to the switch control portion 4 through an output I/F 33 and a communication line 41 for a call control message (384). Besides, at the time of VC release, release of resources, set-up release of a line interface portion, and deletion of the call administration table are performed in the steps of procedure similar to the above.

Furthermore, the processing operation of the switch control portion 4 (control in a direction from the call processing portion toward the switch), to be concrete, the processing operation of call control messages 72, 73 and 74 from the call processing device 3 in the switch control portion 4 will be described.

Figure 16:
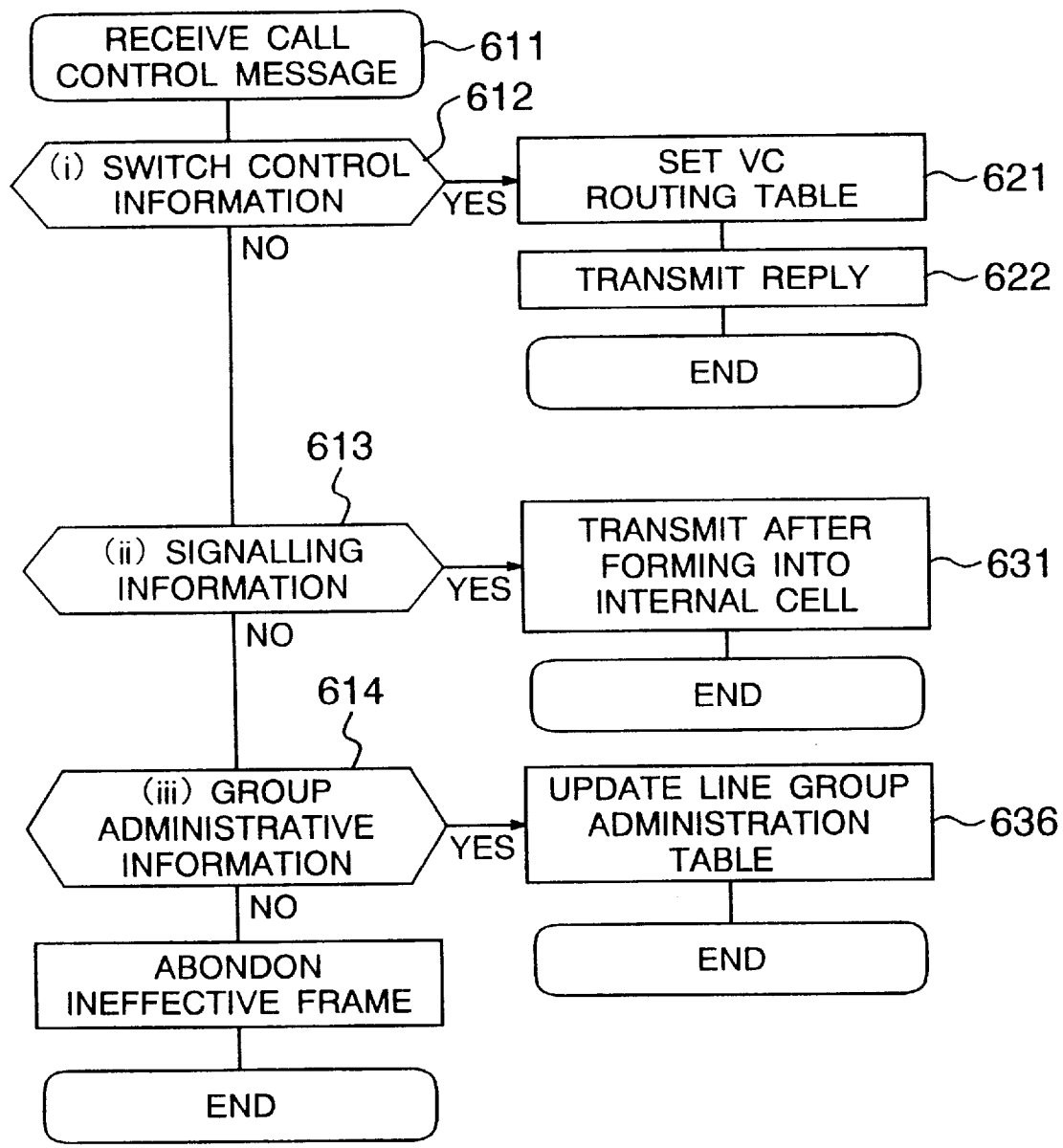
FIG. 16 is a processing flow chart showing the operation of a switch control portion.

FIG. 16 is a processing flow chart showing the operation of the switch control portion 4, and shows processing of the call control messages shown in FIG. 9 to FIG. 11. As shown in FIG. 6, the switch control portion 4 receives signaling information 72, switch control message 73 and line group administration message 74 from the call processing device 3 through an input I/F 471 (611). A call control message type identifying portion 472 identifies the type of a message from message type information included in a call control message (612, 613, 614), and performs the following processing depending on the type of the message.

(i) When the message is the switch control message 73 shown in FIG. 10, a VC routing table 571 of the designated line interface 5 is set from a line interface control portion 481 through a line interface control bus I/F 482 and a bus 52 (621). Here, a VC routing table 571 of line interfaces 5a and 5b is set in accordance with switch control information. Then, the reply notifying of the success or the failure of setting is transmitted to the call processing device 3 (622).

(ii) When the message is the signaling information 72 shown in FIG. 9, an output ATM line number is detected by an internal cell forming portion 477, and the signaling message formed into an internal cell is transmitted to the output ATM line number (631). Here, the signaling message is transmitted to the ATM line 51a or 51b.

(iii) When the message is the line group administration message 74 shown in FIG. 11, a line group table update portion 486 updates the line group administration table so as to alter the call processing device 3 corresponding to the line number and the line group in accordance with the contents thereof (636). The communication routing is switched by the update of the line group administration table.

As described above, according to the present embodiment, the call processing in case the input ATM line and the output ATM line belong to the same line group is performed in such a manner that all of the call processings are performed by means of one call processing device, and the load is dispersed by performing another call processing independently in another call processing device.

(2) Call processing in the case of line groups having different input-output lines When the line groups of the input ATM line and the output ATM line are different from each other, cooperative processing by two call processing devices becomes necessary. The call processing operation by two call processing devices 3a and 3b will be described hereinafter taking a case that the input ATM line is an ATM line 51a belonging to a line group 53a and the output ATM line is an ATM line 51c belonging to a line group 53b as an example.

When the input ATM line and the output ATM line belong to different line groups, the point in which the signaling message from the input ATM line 51a is processed by means of a signaling stack 31a of the corresponding call processing device 3a and the processing until the call administration portion 321 receives VC setting requirement (up to 376 shown in FIG. 14) are also the same as the case (1) described above. Further, the operation of the switch control portion 4 shown in FIG. 16 is also the same as that shown in FIG. 16 because the operation is not affected by whether the input ATM line and the output ATM line belong to the same line group or not.

Figure 17:
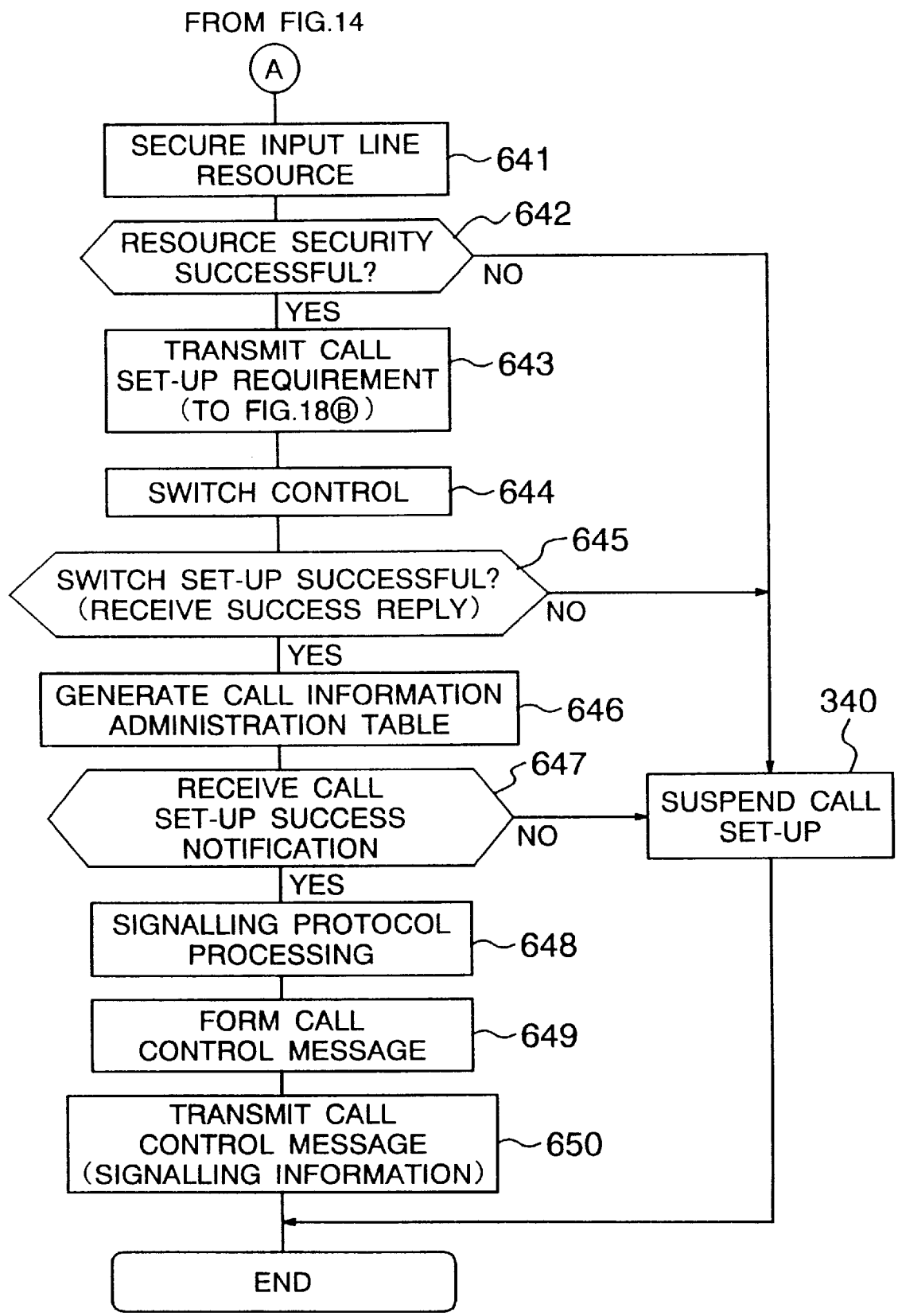
FIG. 17 is a processing flow chart showing the operation of a call processing device.

FIG. 17 is a processing flow chart showing the operation of the switch control portion 4, and the call processing in case the input-output lines are different in the step 376 shown in FIG. 14 and thereafter will be described hereinafter with reference to FIG. 17 and FIG. 13.

In the call administration portion 321, an output ATM line 51c which is an output to a called terminal is determined from a destination ATM address included in the VC set-up requirement using the routing table 327. Here, since the ATM line 51c does not belong to a line group administrated by the call processing device 3a, the call administration portion 321 secures only the resources required for the input ATM line by means of a resource administration table 329 (641). When resources are secured successfully (642), a call set-up continuation message 75 shown in FIG. 12 is transmitted to the call processing device 3b which administrates a line group 53b to which the ATM line 51c belongs through a communication portion among call processing portions 322 and output I/F 33 (643). The information included in the call set-up continuation message 75 are a message type identifier and attribute information related to calls of an output ATM line number, a call number, a calling system, a called system ATM address, QoS information and so on.

Then, the call administration portion 321 transmits the switch control message 73 to the switch control portion 4 by the call control message communication line 41 through the communication portion 323 between call processing and switch control portions and the output I/F 33, and sets up the VC routing table 571 of the line interface 5a similarly to (1) (i) (644). When set-up is completed normally and a reply is received (645), the call administration portion 321 generates a call administration table 326 related to the set up VC (646).

The call administration portion 321 of the call processing device 3a which has received a reply of normal termination (647, 648) from the call administration portion 321 on the call processing device 3b which administrates the output ATM line 51c requests a signaling stack 31a corresponding to the input ATM line 51a to issue a signaling message for notifying of VC set-up continuation. The signaling message generated by the signaling stack 31a (648) is added with an identifier showing a message type and an output line as shown at 72 in FIG. 9 (649), and is transmitted to the switch control portion 4 through the output I/F 33 (650).

Figure 18:
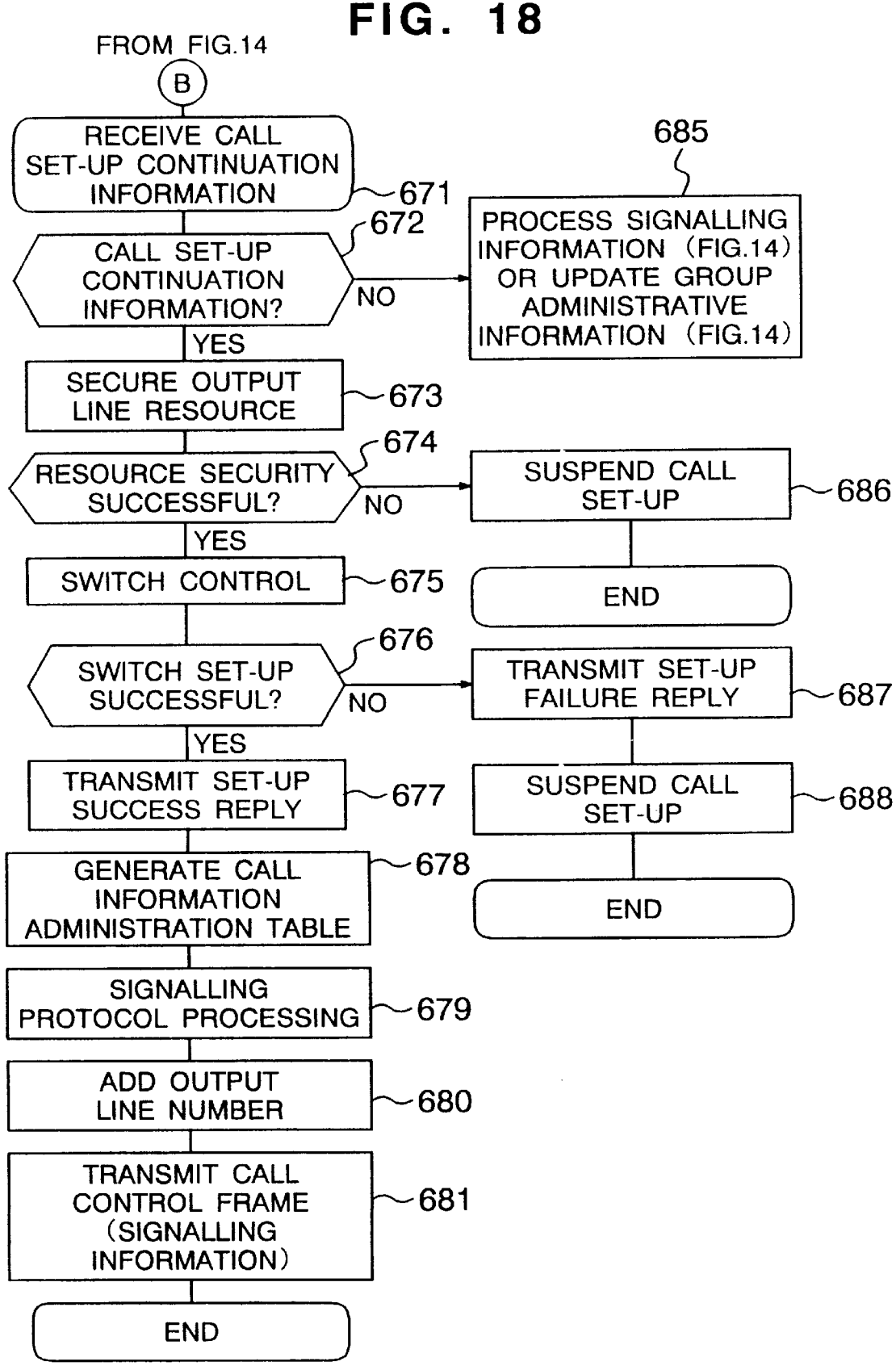
FIG. 18 is a processing flow chart showing the operation of a call processing device.

FIG. 18 is a processing flow chart showing the operation of the call processing portion 3b for administrating the output ATM line. Since the call processing portion 3b has the same structure as the call processing portion 3a, the operation is described hereinafter with reference also to FIG. 13.

The call set-up continuation message 75 from the call processing device 3a is received through an input I/F 36 (671). The message type thereof is identified by a call control message straddling portion 35, and is delivered to the communication portion among call processing portions 322 (672) since it is call set-up continuation information in this case. The communication portion among call processing portions 322 delivers the call processing continuation requirement to the call administration portion 321, and the call administration portion 321 secures resources (VPI/VCI, band, etc.) required in the output ATM line from the resource administration table 329 using the output ATM line number included in the call processing continuation requirement (673). When resources are secured successfully (674), a VC routing table 571 of the line interface 5c is set by transmitting a switch control message to the switch control portion 4 through the communication portion between call processing and switch control portion 323, the output I/F 33 and the call control message communication line 41 (675). When set-up is completed normally (676), a VC set-up success reply is sent back to the call administration portion 321 on the call processing device 3a by the communication portion among call processing portions 322 (677). Then, a call administration table 326 related to the set-up VC is generated (678), and issuance of a signaling message for notifying the succeeding ATM switching system of VC set-up continuation to the signaling stack 31b corresponding to the output ATM line 51c is requested. A signaling frame generated by the signaling stack 31b (679) is formed into a call control message added with an identifier showing a frame type and an output line in an output line number adding portion 34 (680), and is transmitted to the switch control portion 4 through the output I/F 33 (681). Besides, at the time of VC release, release of resources, set-up release of line interface portions 5a and 5c, and deletion of the call administration table are performed in accordance with the steps of procedures similar to the above. When security of resources was unsuccessful in 674, call set-up is suspended (686). When switch set-up is unsuccessful in 676, a set-up failure reply is transmitted to the call processing device 3a (687), and call set-up is suspended (688).

Figure 19:
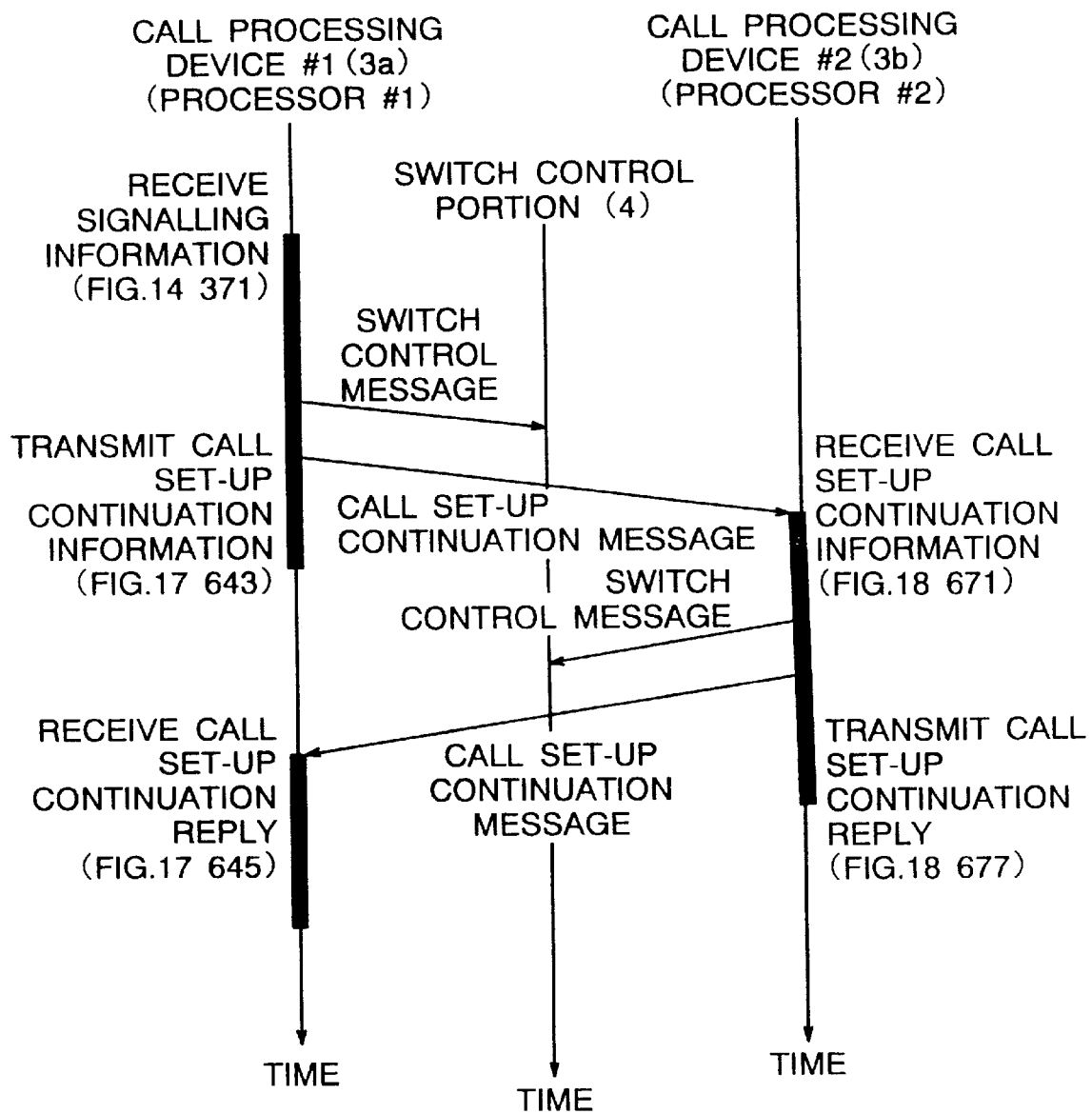
FIG. 19 is an operation sequence diagram showing the call processing operation of a call processing device.

FIG. 19 is a sequence diagram showing a rough sequence of processing in the call processing portion 32 of respective call processing devices 3a and 3b described above. In the present embodiment, in call processing when the ATM line 51a and the ATM line 51c belonging to different line groups become the calling system ATM line and the output ATM line, respectively, resource administration and control related to the ATM line 51a and processing of the signaling message are performed by the call processing device 3a and resource administration and control related to the ATM line 51c and processing of the signaling message are performed by the call processing device 3b, thus making it possible to disperse the load.

According to the ATM switching system of the present invention, the call processing device 3 performs data administration of the call administration table 326, the resource administration table 329, the routing table 327 and so on in the unit of line group (a call administration portion unit), and the interaction among them is all performed by switching the call control messages. Therefore, switching of the call processing device at the time of fault occurrence can be realized easily by coping with the fault in the unit of line group. An operation example in which, fault recovery is aimed at by taking over functions with the call processing device 3b when a fault occurs in the call processing device 3a in the ATM switching system having a structure shown in FIG. 1 will be described hereinafter.

Figure 20:
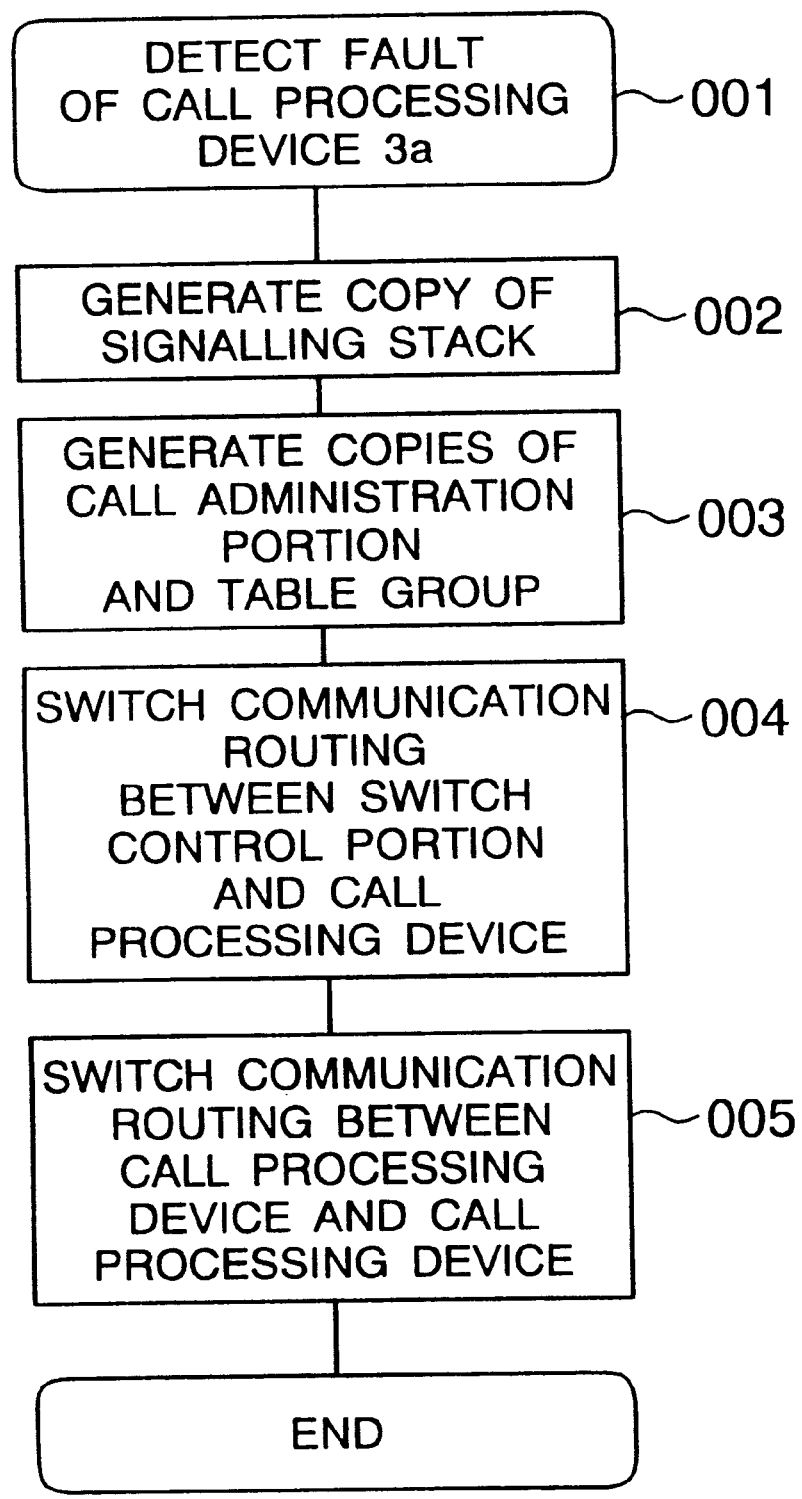
FIG. 20 is a processing flow chart showing a fault recovery operation of a call processing device.
Figure 21:
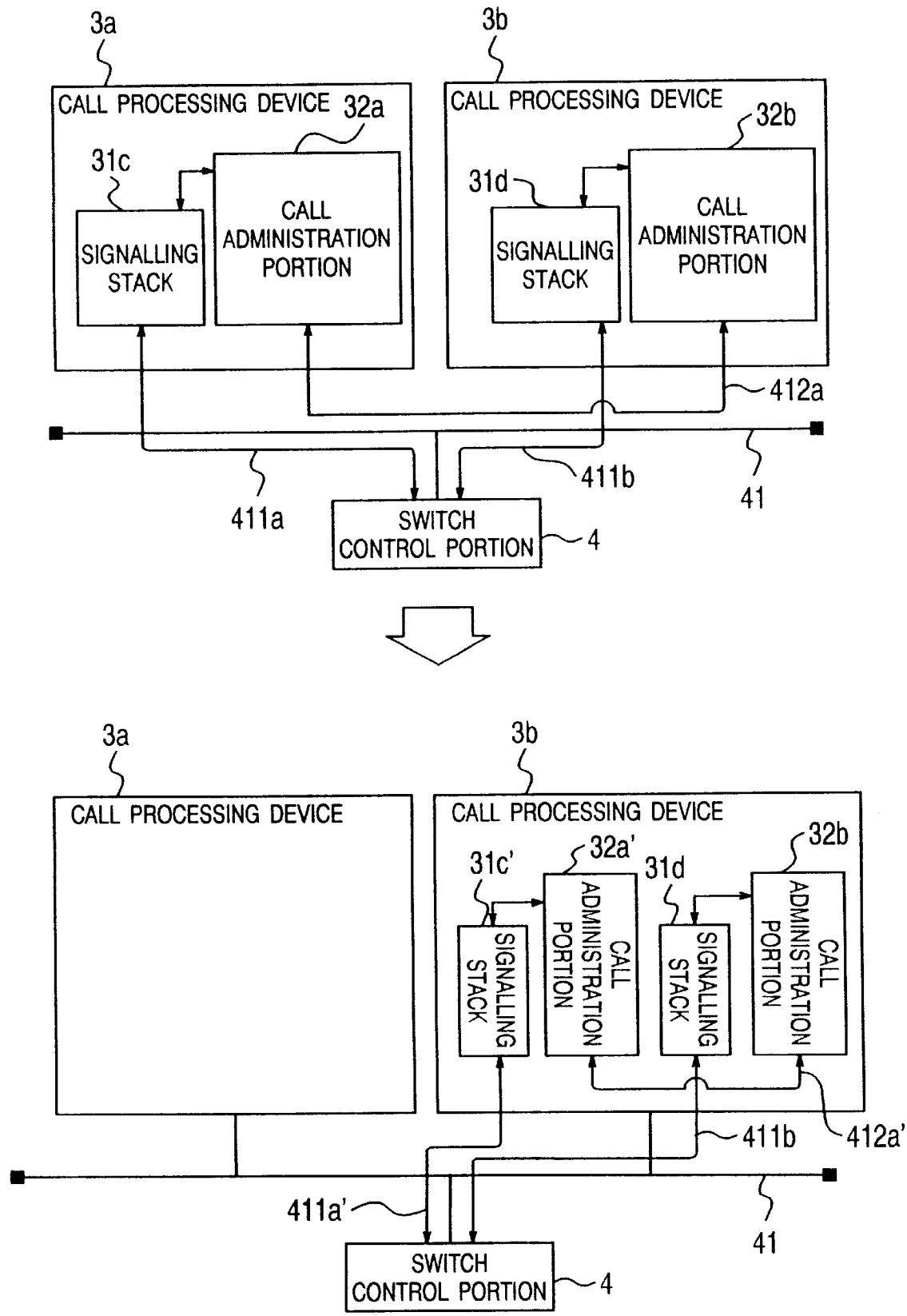
FIG. 21 is a block diagram showing a structure of a call control device.

FIG. 20 is a processing flow chart showing a fault recovery operation of the call processing device 3 of the ATM switching system according to the present invention. Further, FIG. 21 is a block diagram of a call control device showing the arrangement of the signaling stacks 31 and the call administration portions 321 before and after the fault occurs. The call processing device 3 of the present invention that succeeds functions when a fault occurs holds duplicates of information of the call administration table 326, the resource administration table 329, the routing table 327, the line group administration table 328 and so on handled by the call administration portion 321 on the call processing device which becomes an object and information of states held by the signaling stacks 31 and so on in advance. These duplicates of information are formed when a change of a state is generated in the call administration portion 321 on the call processing device which becomes an object or in the signaling stacks 31 or when the load of the call processing device is low. It is assumed hereinafter that duplicates of the data of switch administration entity of the call processing device 3a are held in the call processing device 3b. Besides, the fault in the call processing device is to be detected by confirming the state periodically between call processing devices or between the call processing device and the switch control portion.

The call processing device 3b which has detected a fault of the call processing device 3a (001) generates a duplicate 31c' of a signaling stack 31c of the call processing device 3a using state information of the signaling stack on the call processing device 3a held in advance (002). Furthermore, a duplicate 32a' of a call administration portion and table group 32a on the call processing device 3a is generated using duplicates of the call administration table 326, the routing table 327, the resource administration table 329 and the line group administration table 328 on the call processing device 3a held in advance (003).

Next, setting of a communication routing 411a between the switch control portion 4 and the call processing device 3a and a communication routing 412a between the call processing devices 3a and 3b are altered (004, 005). To be concrete, the communication routing 411a which has been set between the switch control portion 4 and the signaling stack 31c on the call processing device 3a is switched to a communication routing 411a' between the switch control portion 4 and the signaling stack 31c' on the call processing device 3b, and a communication routing 412a which has been set between a call administration portion 32a of the call processing device 3a and a call administration portion 32b of the call processing device 3b is switched to a communication routing 412a' between a call administration portion 32a' generated newly on the call processing device 3b and the call administration portion 32b which has been in existence in 3b since before the fault occurs. The switching of the communication routing is made by exchanging the group administration message 74 shown in FIG. 11 between the call processing portions 3a and 3b and between the call processing portions 3a and 3b and the switch control portion 4 and by updating a call processing device number of a line group administration table 328 (see FIG. 14 (386), FIG. 18 (685) and FIG. 16 (614)). With the present operation, the call processing device 3b can succeed call processing of the call processing device 3a while maintaining the already set up call as it is.

Thus, according to the present embodiment, it is also possible to recover to the state before the fault at the time of fault recovery by duplicating states and table groups, generation of the signaling stack and the call administration portion and switching of the communication routing.

Furthermore, according to the ATM switching system of the present invention, dynamic load sharing suitable for the load state of the system can be realized in the unit of ATM line by a method similar to the above-mentioned fault recovery system.

An example of dynamic load sharing in which a part of call processing is borne by the call processing device 3b when the call processing device 3a shows an overload state in the ATM switching system having the structure shown in FIG. 1 will be described hereinafter. In this dynamic load sharing processing, the line group related to the call processing device 3a is divided into smaller groups (hereinafter, this group is referred to as a sub-group) in advance and then call processing is performed.

Figure 22:
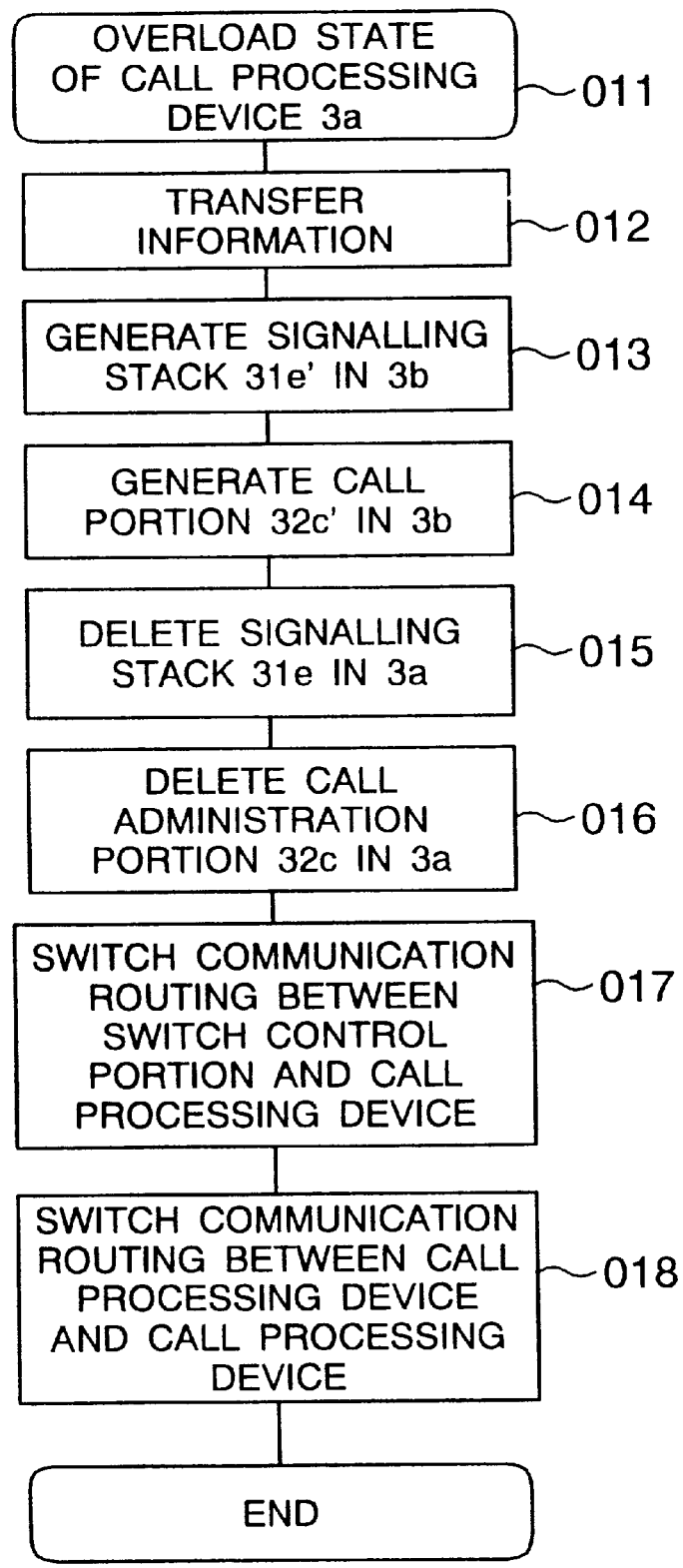
FIG. 22 is a processing flow chart showing a load sharing operation of a call processing device.
Figure 23:
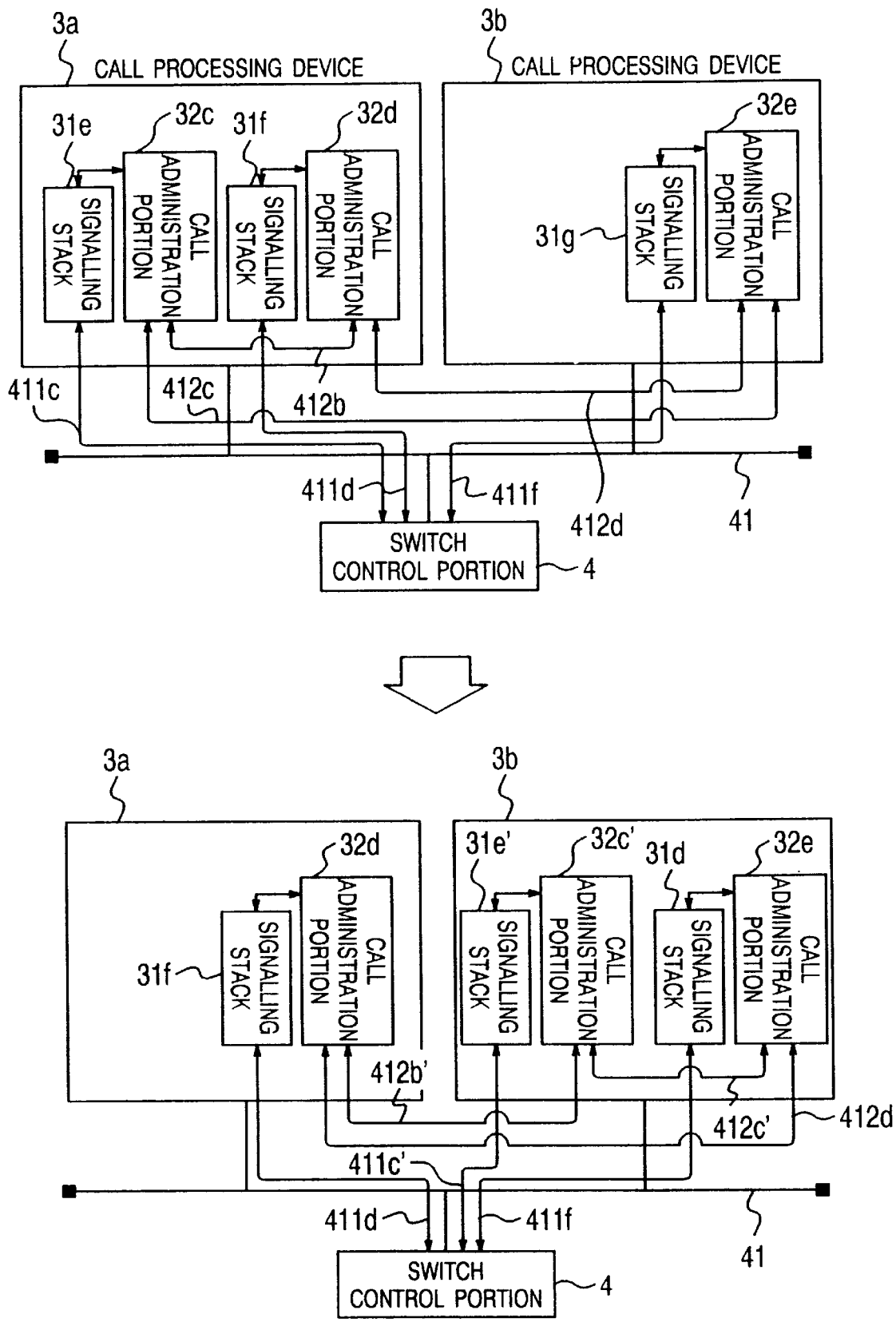
FIG. 23 is a block diagram showing a structure of a call control device.

FIG. 22 is a processing flow chart showing the operation when the call processing device 3 performs load sharing, and FIG. 23 is a block diagram of a call control device showing the arrangement of signaling stacks 31 and call administration portions 321 before and after load sharing. Besides, it is assumed in the description hereinafter that the call processing device 3a performs call processing of two line sub-groups, and signaling stacks 31e and 31f and independent call administration portion and table groups 32c and 32d are allocated to each line sub-group.

First, the call processing device 3a transfers state information of a signaling stack group (which is assumed to be 31e here) of an optional sub-group and information of the call administration portion and table group 32c to the call processing device 3b (012) at the time of overload state (011).

Next, similarly to fault recovery processing, a duplicate 31e' of the signaling stack group 31e and a duplicate 32c' of the call administration portion and the table group 32c are generated (013, 014) in the call processing device 3b, and the signaling stack group 31e, and the call administration portion and table group 32c are deleted (015, 016) in the call processing device 3a.

Then, the set-up of communication routings 411c, 411d and 411f between the switch control portion 4 and the call processing devices 3a and 3b and communication routings 412b, 412c and 412d among call processing devices is altered as occasion demands (017, 018). To be concrete, the communication routing 411c which has been set between the switch control portion 4 and the signaling stack 31e on the call processing device 3a is switched to a communication routing 411c' between the switch control portion 4 and the signaling stack 31e' on the call processing device 3b, and a communication routing 412b which has been set between the call administration portions 32c and 32d on the call processing device 3a and a communication routing 412c which has been set between the call administration portion 32c on the call processing device 3a and a call administration portion 32e on the call processing device 3b are switched to a communication routing 412b' between the call administration portion 32d on the call processing device 3a and a call administration portion 32c' newly generated on the call processing device 3b and a communication routing 412c' between the call administration portion 32e on the call processing device 3b and a call administration portion 32c' newly generated on the call processing device 3b, respectively. The switching of the communication routing is made by exchanging call control message including group administrative information among call processing devices and between the call processing device and the switch control portion 4, and updating the call processing device number of the group administration table.

Thus, according to the present embodiment, it is possible to succeed a part of call processing by the call processing device 3a with 3b while maintaining the already set up call as it is.

<The Second Embodiment>

Figure 24:
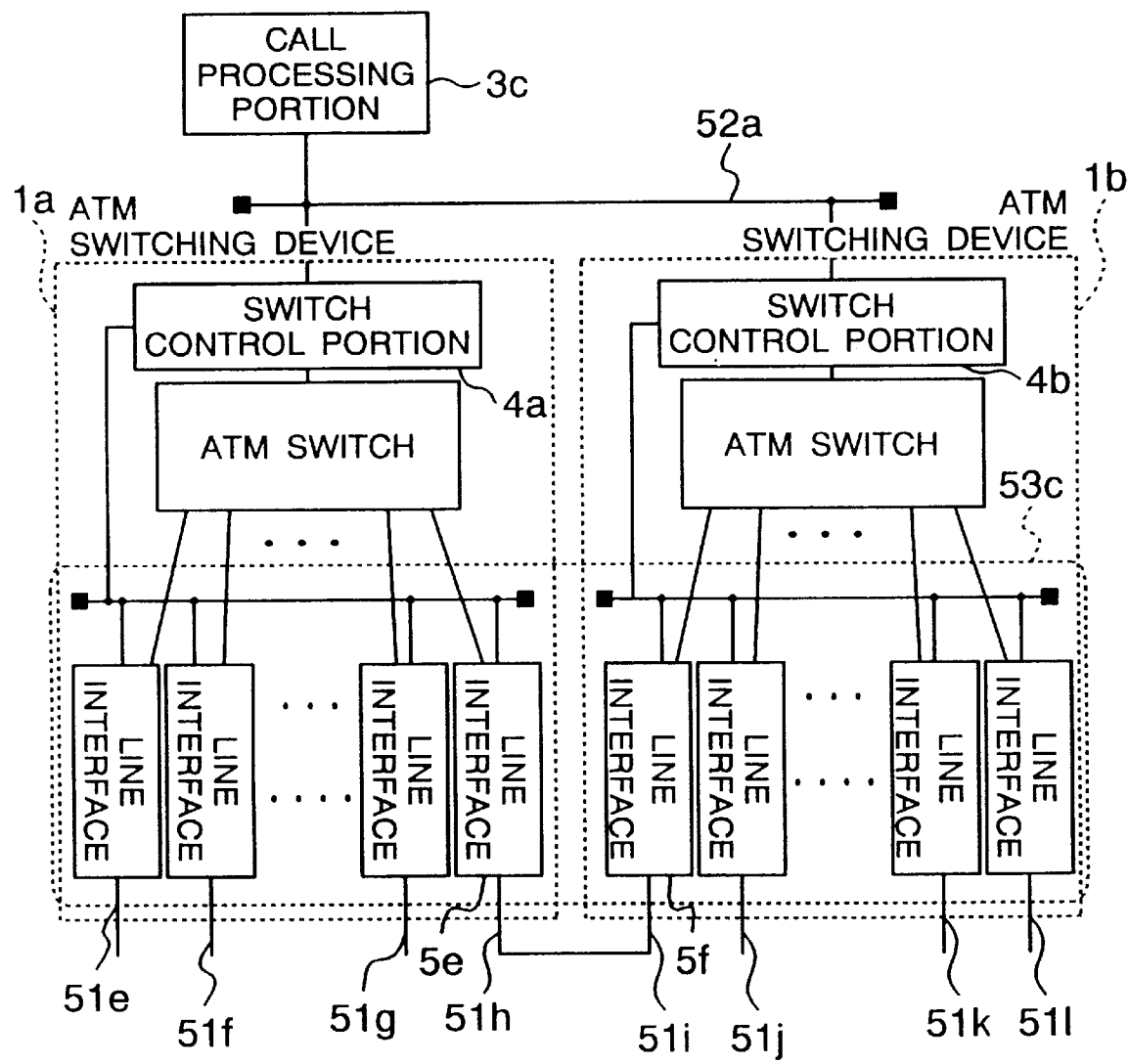
FIG. 24 is a block diagram showing another structure of an ATM switching system according to the present invention.

Although the description of the above-mentioned embodiment shows a call processing system in an ATM switching system of the present invention of a structure having a plurality of call processing portions in one ATM apparatus, an ATM switching system of the present invention is also capable of ATM switching processing comprising two or more ATM switching devices and one call processing device. FIG. 24 is a block diagram showing another structural example of an ATM switching system of the present invention composed of two ATM switching devices 1a and 1b and one call processing portion 3c. The structure of each of the ATM switching devices 1a and 1b is the same as that of the ATM switching device 1 described previously, but is different from the previous embodiment in that an ATM line 51h of the ATM switching device 1a and an ATM line 51i of the ATM switching device 1b are connected to each other, and one call processing device 3c is held in common by being connected to a switch control portion 4a of the ATM switching device 1a and a switch control portion 4b of the ATM switching device 1b with a communication line 52a for call control message, respectively.

In the ATM switching system of the present invention, the call processing device 3 is assigned in the unit of line group of an ATM input-output line administrated with a line group administration table 328, but, by forming all of ATM lines 51e to 51g and 51j to 51l except the ATM lines 51h and 51i as the same line group 53c in two ATM switching devices 1a and 1b, one cell processing portion 3c takes charge of call processing related to these ATM lines. In the present structure, when the input ATM line and the output ATM line belong to the same ATM switching device 1a or 1b, e.g., when they are the ATM line 51e and the ATM line 51f, the call processing thereof is the same as the case (1) when the calling system and called system ATM lines of the previous embodiment belong to the same line group. When the ATM lines of the input and the output belong to different ATM switching devices 1a and 1b, however, it is required to set up a line interface 5e of a transit ATM line 51h and a line interface 5f of the ATM line 51i for the transit among ATM switching devices. Accordingly, call processing when the ATM lines of the calling system and the called system belong to different ATM switching devices will be described taking a case that the input ATM line is 51e which belongs to the ATM switching device 1a and the called system ATM line is 51j which belongs to the ATM switching device 1b as an example.

Figure 25:
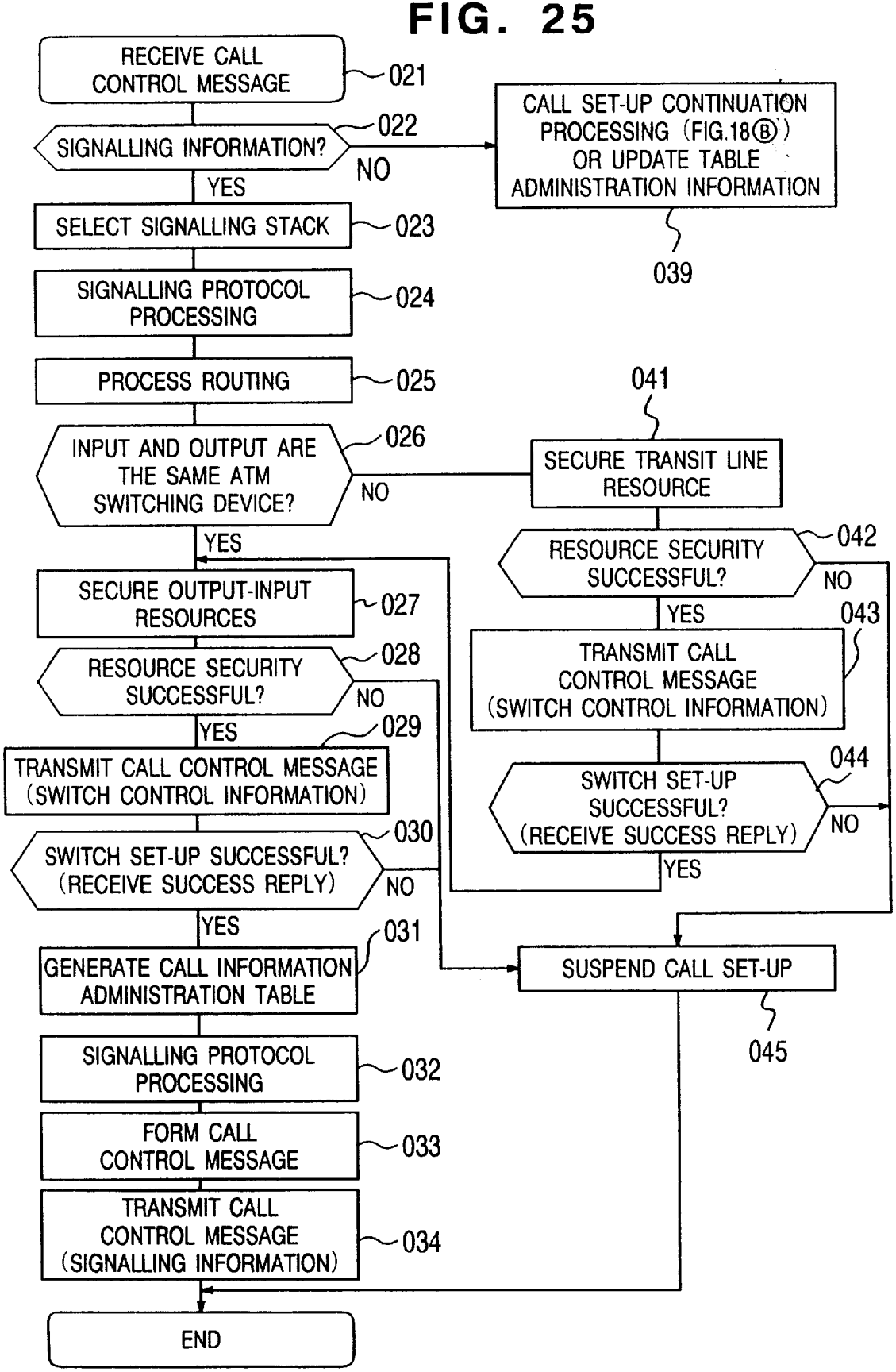
FIG. 25 is a processing flow chart showing the operation of a call processing device.
Figure 42:
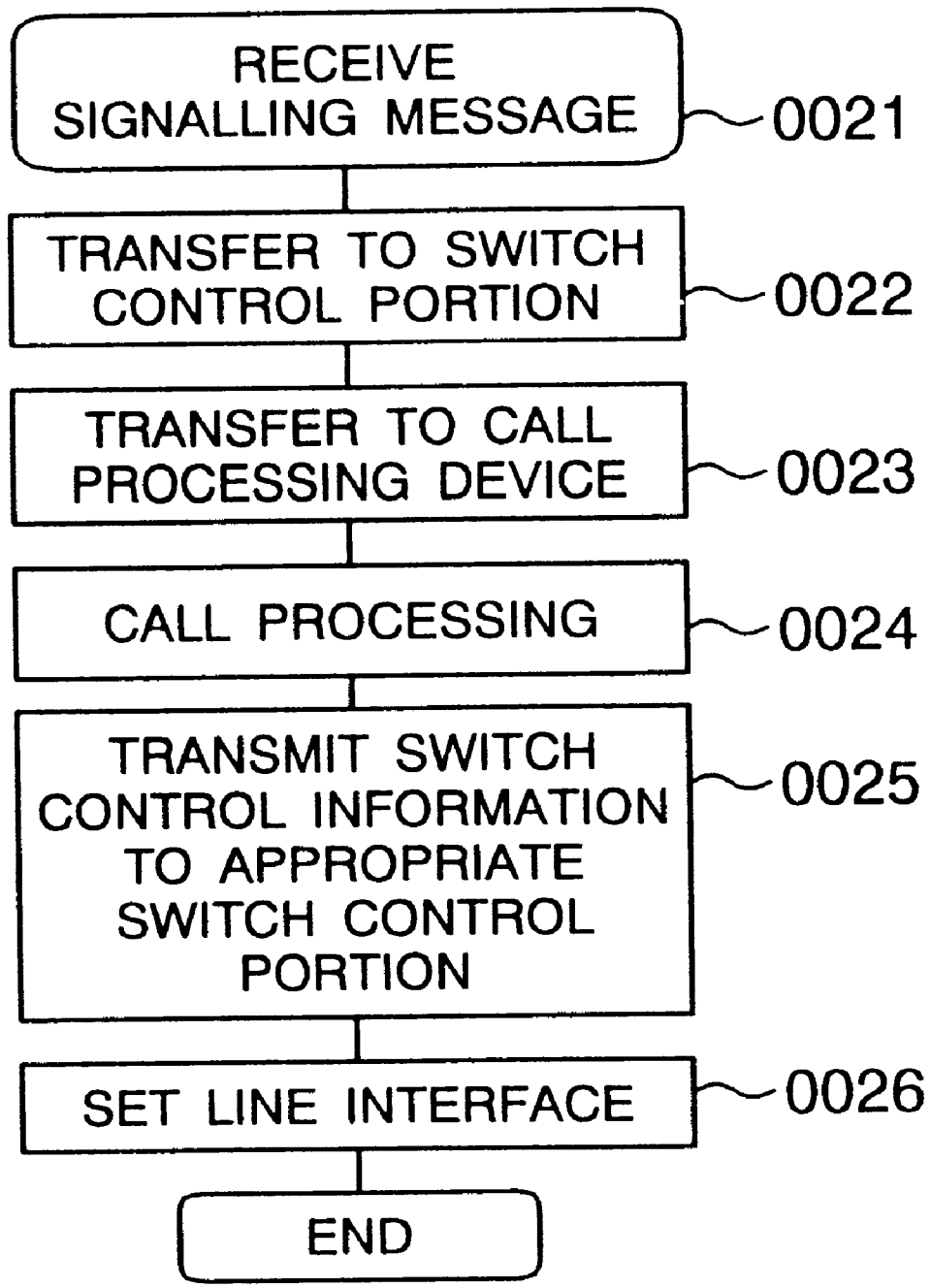
FIG. 42 is a chart showing a processing flow of the ATM switching system shown in FIG. 24.

FIG. 42 is a diagram showing a rough sequence of call processing at a system level in the present embodiment. A signaling message (0021) which has arrived at the line interface from the ATM line is transferred to a switch control portion directly or through an ATM switch (0022). In the switch control portion, the signaling message is transferred to one call processing device provided in the system through a switch control message communication line (0023). The call processing device performs call processing (0024), transmits a switch control message to the switch control portion of the ATM switching device to which the input ATM line and the output ATM line belong through the switch control message communication line (0025), and the switch control portion sets up a VC routing table of the line interface through a bus based on a switch control message, thereby to set the VC (0026). FIG. 25 is a processing flow chart showing the operation of the call processing device 3 in the second embodiment. The call processing operation of the call processing device 3c will be described hereinafter with reference to the block diagram shown in FIG. 13 and the processing flow chart shown in FIG. 25.

The processing up to routing processing by the call administration portion 321 (025) is the same as the processing up to FIG. 14 (375). Since an ATM line 51j which belongs to the ATM switching device 1b which is different from the ATM switching device 1a to which an input ATM line 51e belongs is selected as the output ATM line (026), the call administration portion 321 first secures resources of the transit ATM lines 51h and 51i for the transit between the ATM switching device 1a and the ATM switching device 1b from the resource administration table 329 (041). When the resources are secured successfully (042), the switch control message 73 shown in FIG. 10 for setting transit ATM line interfaces 51h and 51i is transmitted to the switch control portion 4 through communication portion between call processing and switch control portions 323 (043). When a transit ATM line is set successfully (044), the resource required in each of the input ATM line 51e and the output ATM line 51j is secured (027). When the resource is secured successfully (028), the switch control message 73 for setting the input-output ATM line interfaces 51e and 51j is transmitted to the switch control portion 4 through the communication portion between call processing and switch control portions 323 (029). When security of the resource or setting of the switch is unsuccessful, the switch control portion 4 erases all of the set-up related to the call on the way of set-up and sustains call processing (045). When all the set-up of the switch is terminated normally with the above, a call administration table 326 is drawn up and a signaling message is issued (031 to 034) similarly to the processing flow shown in FIG. 14. Besides, at the time of VC release, release of the resource, release of set-up of the line interface portion and deletion of the call administration table are performed.

As described, in the second embodiment, it is possible to structure an economical system by that one call processing device performs call processing of a plurality of ATM switching devices.

<The Third Embodiment>

Figure 26:
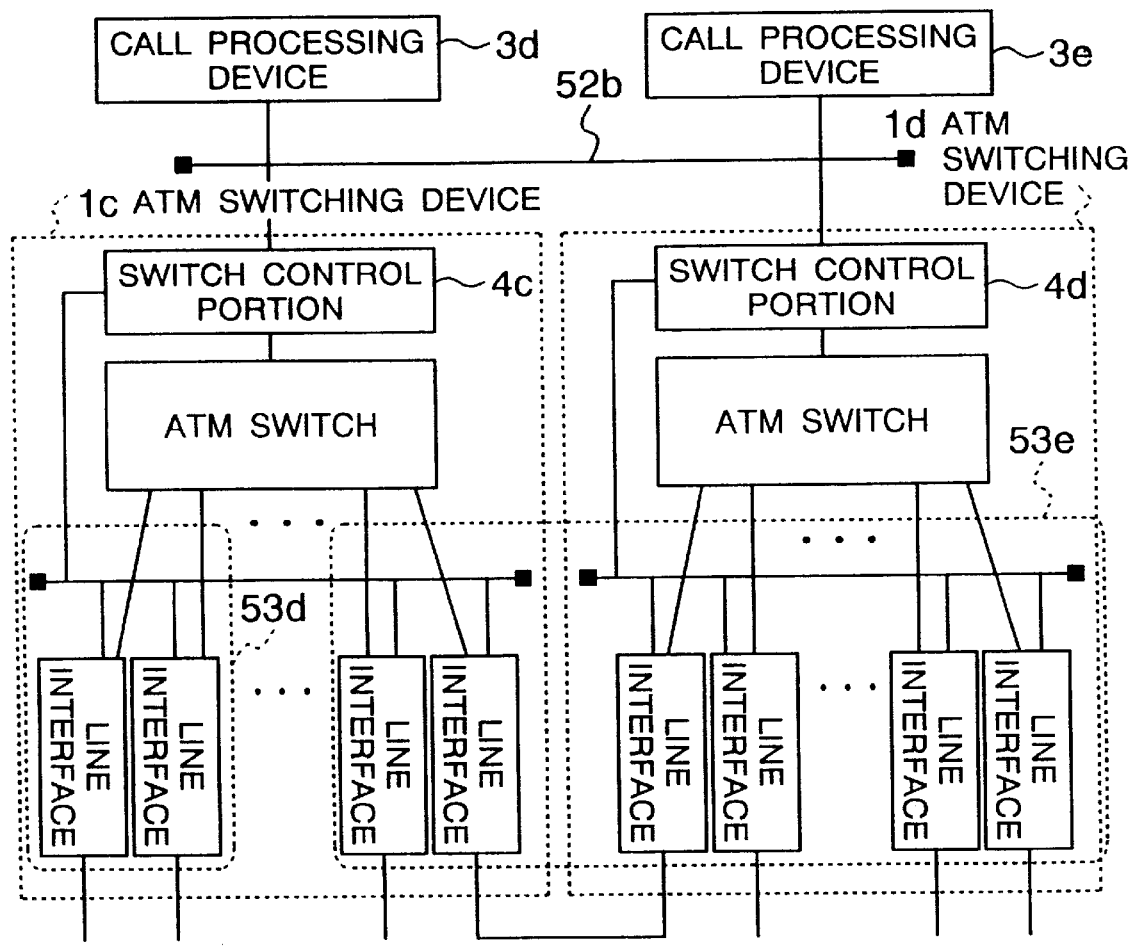
FIG. 26 is a block diagram showing another structure of an ATM switching system according to the present invention.

According to an ATM switching system of the present invention, it is also possible to process with switching by forming a structure of a plurality of ATM switching devices and a plurality of call processing devices. FIG. 26 is a block diagram showing another structural example of an ATM switching system of the present invention. As an example, an ATM switching system is structured of two ATM switching devices 1c and 1d and two call processing devices 3d and 3e. Switch control portions 4c and 4d of the ATM switching devices 1c and 1d and the call processing devices 3d and 3e are connected to one another with a call control message communication line 52b, and the call processing devices 3d and 3e perform processing of a call with the ATM line belonging to line groups 53d and 53e, respectively, as the calling system or an output ATM line.

Figure 43:
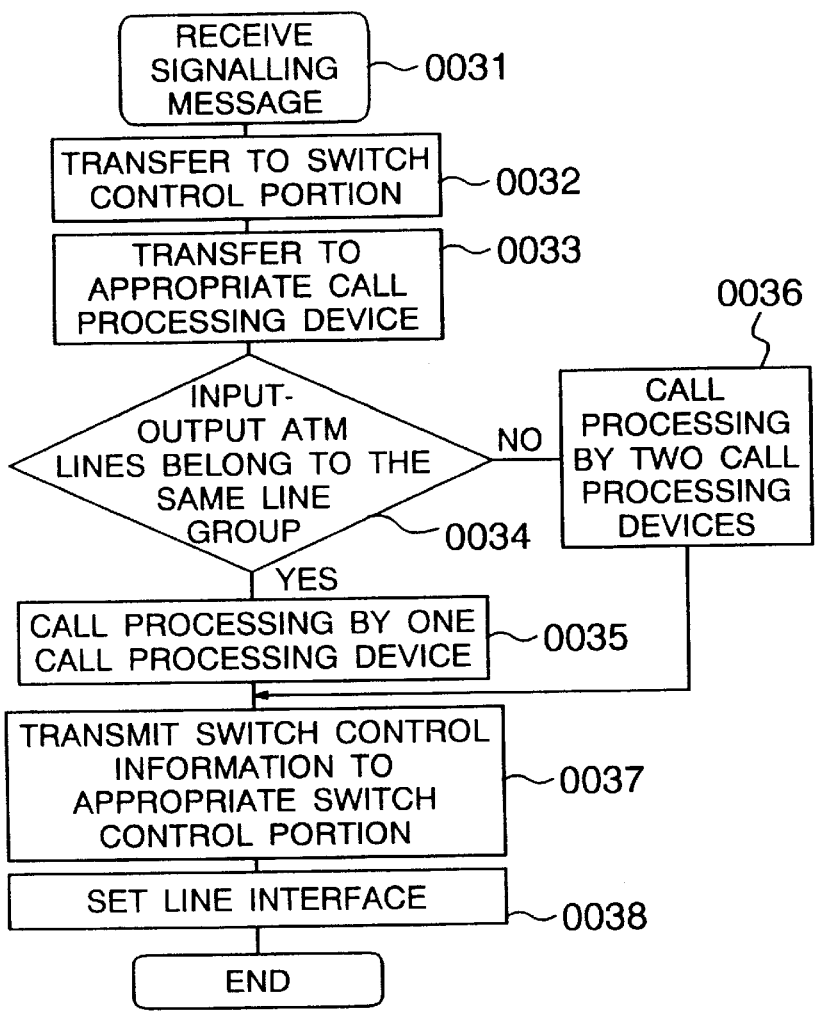
FIG. 43 is a chart showing a processing flow of the ATM switching system shown in FIG. 26.
Figure 44:
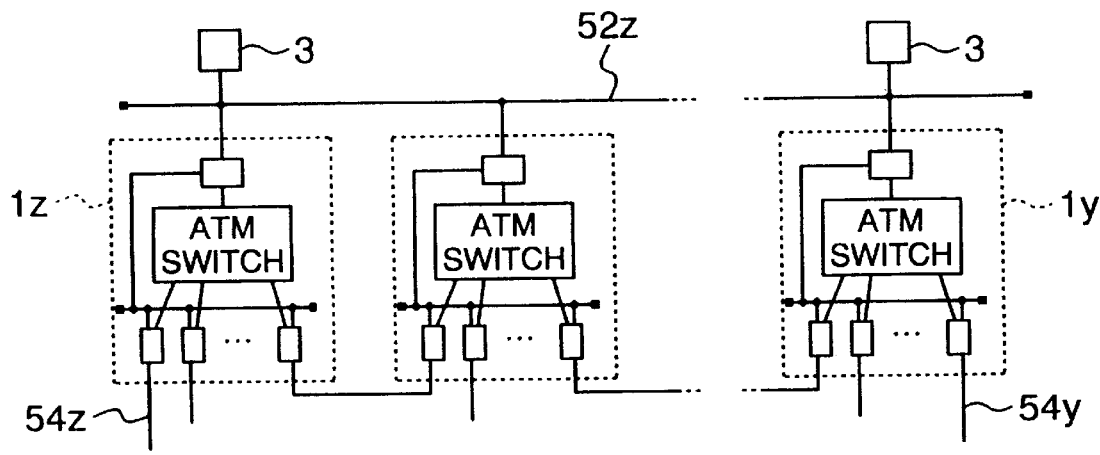
FIG. 44 is a diagram showing another embodiment of the ATM switching system shown in FIG. 26.

FIG. 43 is a diagram showing a rough sequence of call processing at a system level in the present embodiment. A signaling message which has arrived at the line interface from the ATM line (003) is transferred to the switch control portion directly or through the ATM switch (0032). In the switch control portion, a signaling message is transferred to an appropriate call processing device (0033) through a switch control message communication line in accordance with group administrative information. In the call processing device, when the input ATM line and the output ATM line belong to the same line group, the call processing device performs processing independently of the other call processing devices (0034, 0035), and, when the input ATM line and the output ATM line belong to different line groups, the corresponding call processing device performs processing in cooperation with the other call processing device assigned with a line group to which the output ATM line belongs (0034, 0036). Further, a switch control message is transmitted to a switch control portion of an ATM switching device to which the input ATM line and the output ATM line belong through the switch control message communication line (0037), and the switch control portion sets a VC routing table of the line interface through a bus based on the switch control message, thereby to set the VC (0038).

According to the present embodiment, a flexible network system structure is obtainable. Therefore, an ATM network system composed mainly of a Permanent Virtual Channel (PVC) connection can be executed by installing an appropriate number of call processing devices, and alteration thereof also becomes possible easily.

When an ATM switching system of the present invention is structured of three or more ATM switching devices, other plurality of ATM switching devices for performing transit are in existence sometimes between an ATM switching device 1z to which an input ATM line 54z belongs and an ATM switching device 1y to which an output ATM line 54y belongs. In this case, the call processing device transmits a switch control message to a switch control portion of the ATM switching device performing transit through a call control message communication line 52z, and the switch control portion performs set-up of a VC routing table of a line interface of a transit switch through a bus based on the switch control message, thereby to set the VC from the input ATM line to the output ATM line.

<The Fourth Embodiment>

FIG. 27 is a block diagram showing another structural example of an ATM switching system of the present invention. The ATM switching system of the present invention has been structured of an ATM switching device 1e and one or more call processing devices 3'a to 3'b, and the structure of the ATM switching device 1e is the same as that of the ATM switching system shown in FIG. 1 except a switch control portion 8. Further, the call processing devices 3'a to 3'b are connected to the ATM switching device 1e by means of optional ATM lines 54a to 54b. Since the call processing devices 3'a to 3'b are connected directly to the ATM lines, it is possible to realize the call processing devices by means of external ATM terminals (a computer having ATM line interfaces) of the ATM switching device and also to contain them in the ATM switching device.

Figure 45:
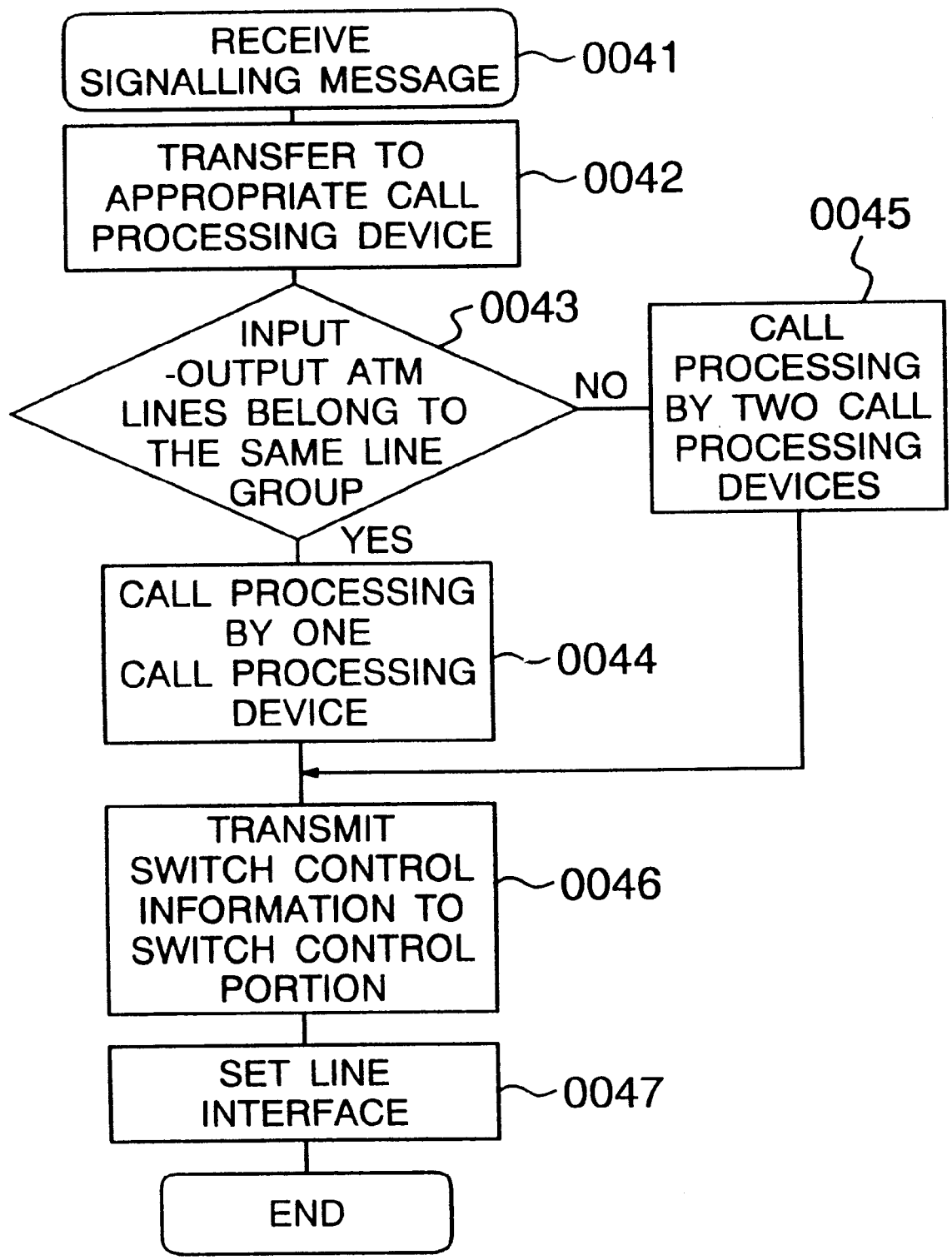
FIG. 45 is a chart showing a processing flow of the ATM switching system shown in FIG. 27.

FIG. 45 is a diagram showing a rough sequence of call processing at a system level in the present embodiment. A signaling message (0041) which has arrived at a line interface from the ATM line is transferred to a call processing device to which a line group to which the line belongs is assigned through an ATM switch in accordance with the entry of the VC routing table of the line interface (0042). In the call processing device, when the input ATM line and the output ATM line belong to the same line group, the call processing device performs processing independently of the other call processing devices (0043, 0044), and, when the input ATM line and the output ATM line belong to line groups different from each other, the corresponding call processing device performs processing in cooperation with the other call processing devices to which a line group to which the output ATM line belongs is assigned through the ATM switch (0043, 0045). Then, a switch control message is transmitted to a switch control portion through the ATM switch (0046), and the switch control portion sets the VC routing table of the line interface through a bus based on the switch control message, thereby to set the VC (0047).

The call processing operation of a system of the present embodiment will be described hereinafter taking an ATM switching system in which the call processing devices 3'a and 3'b are connected to the ATM lines 54a and 54b as an example. Since the call processing devices 3'a and 3'b are connected directly to the ATM lines, the call processing according to the present embodiment is the same call processing as that in the above-mentioned embodiment except that the switching system among signaling information 72, switch control information 73, call set-up continuation information 75 and line group administration information 74 shown in FIG. 9 to FIG. 12 is different. Therefore, those portions that are different will be described hereinafter.

(1) Call processing in case the input line and the output line of the VC belong to the same line group When the ATM lines 54c and 54d belonging to the same line group 56a become a calling system ATM line and an output ATM line, respectively, a signaling message arriving at a line interface 55i from the ATM input-output line 54c is transferred using a logical channel having a VPI/VCI value of 0/5. FIG. 28 is a table diagram showing a structure of a routing table 571' provided in the line interface. Respective line interfaces 55g to 55l performs VC routing of a signaling message received from a VC of a VPI/VCI value of 0/5 to the ATM line 54a (the output line number #1) connected to the call processing device 3'a by the VC routing table 571' shown in FIG. 28 (the value of each entry is the line interface 55i of the line number #3). Namely, the signaling message is routed to the call processing device 3'a by means of a VC having a VPI/VCI value of i/j. Similarly, each line interface has a VC routing table for performing VC routing of a signaling message to a call processing device for performing call processing of a line group to which the line belongs.

Figure 29:
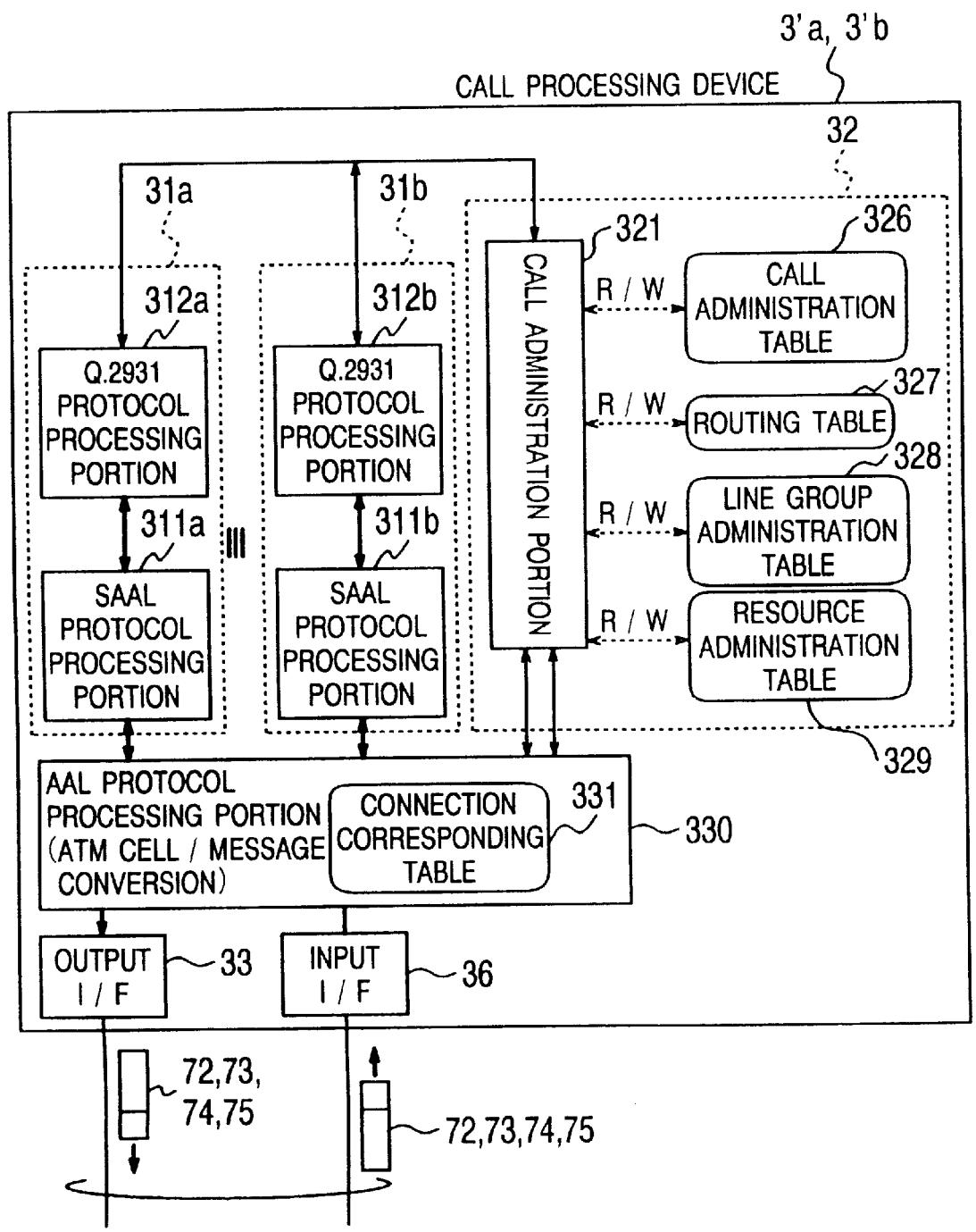
FIG. 29 is a block diagram showing a structure of a call processing device.

FIG. 29 is a block diagram showing a structure of call processing devices 3'a and 3'b. Since an ATM network is used as communication means, these call processing devices 3'a and 3'b are provided with a cell/frame conversion portion 330 for performing AAL protocol processing at an input-output portion of the call processing device shown in FIG. 13. In the call processing devices 3'a and 3'b which have received an ATM cell through an input I/F 36, a signaling message is structured by the AAL protocol processing portion 330. In the previous embodiment 1, a signaling message has been delivered to an appropriate signaling entity on the basis of the input line number included within a reception frame, but identification thereof is made here depending on the VPI/VCI value of the received ATM cell.

In signaling stacks 31, call administration portions and a table group, the same processing as that in the embodiment 1 is performed. At the time when the signaling message is transmitted, however, the signaling message 72 is formed into an ATM cell and transmitted by the corresponding VC. Further, the switch control message 73, the call set-up continuation request message 75, and the group administration message 74 are also formed into ATM cells, and are transmitted using VCs which have been set between the call processing portions 3'a and 3'b and the switch control portion 8, respectively, and the message type is identified by these VCs.

FIG. 30 is a table diagram showing a structure of a connection administration table 331 showing a bind relationship of a VC in the call processing device 3'a, and FIG. 31 is a table diagram showing a structure of a VC routing table 571" of the line interface 55g.

A first entry of FIG. 30 shows that a signaling stack 31a of the call processing device 3a' transmits and receives a signaling message using a VC having a VPI/VCI value of i/j. The steps of procedure will be described hereinafter taking the values of table entries of FIG. 28 and FIG. 31 as the example.

A signaling message transmitted by the signaling stack 31a to a VC having a VPI/VCI value of i/j is transmitted from a VC having a VPI/VCI value of 0/5 (a signaling VC) of the line number #3 (the ATM line 54c) by the set-up of the first entry of FIG. 31. Further, a signaling message received from a VC having a VPI/VCI value 0/5 of the ATM line is transmitted from a VC having a VPI/VCI value of i/j of the line number #1 (the ATM line 54a) by setting a VC routing table of a line interface 55i of the ATM line 54c as the first entry of FIG. 28. In a word, the signaling stack 31a transmits and receives a signaling message of the ATM line 54c using a VC having a VPI/VCI value of i/j. Similarly, the call administration portion transmits and receives a switch control message to and from the switch control portion by a VC having a VPI/VCI value of o/p, thereby to control the switch (setting of a line interface) and transmits and receives a control message among the call processing devices by a VC having a VPI/VCI value of q/p.

Figure 32:
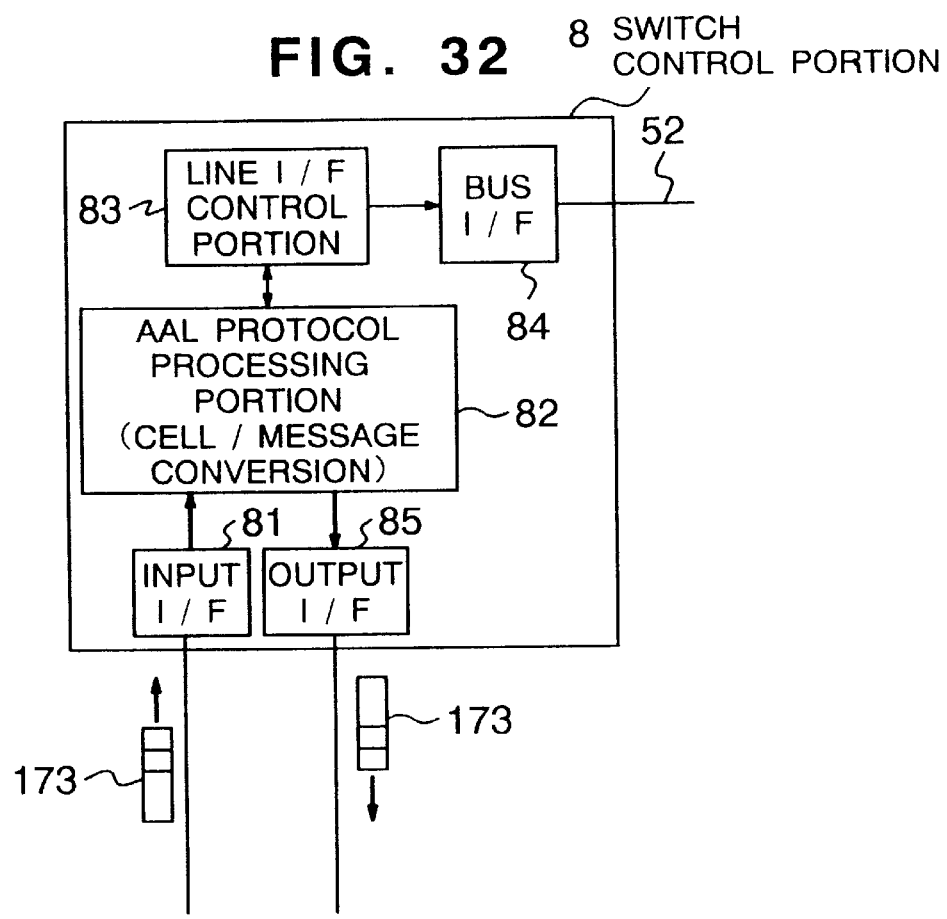
FIG. 32 is a block diagram showing a structure of a switch control portion.
Figure 33:
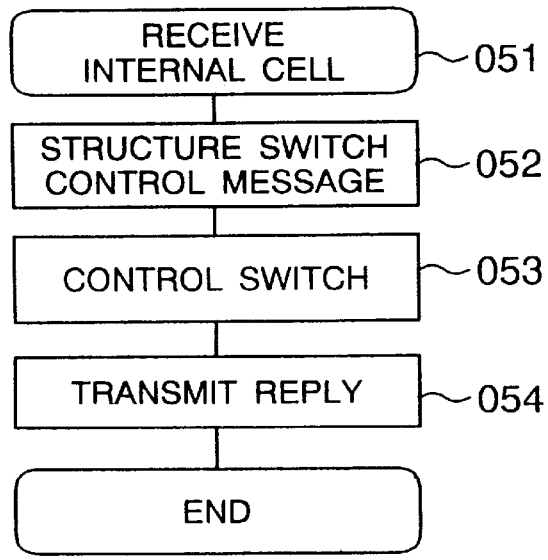
FIG. 33 is a processing flow chart showing the operation of the switch control portion.

Next, processing of a switch control message from a call processing device in a switch control portion 8 will be described. FIG. 32 is a block diagram showing a structure of the switch control portion 8, and FIG. 33 is a processing flow chart showing the operation of the switch control portion 8.

An AAL protocol processing portion 82 which has received an internal cell /73 (051) including the switch control message 73 (FIG. 10) from the call processing device 3'a through an input I/F 81 restructures switch control information (052), and the line interface control portion 83 sets a VC routing table 571" of the line interfaces 54c and 54d through a bus I/F 84 and a switch control bus 52 (053). Then, the switch control portion 8 transmits a reply for notifying of a success or a failure of set-up to the call processing device 3 (054).

(2) Call processing in the case of a line group having different input-output lines In this case, since the input ATM line and the output ATM line also belong to different line groups similarly to the previous embodiment 1, cooperative processing with two switching processing devices become necessary. For example, in call setting with the ATM line 54c belonging to a line group 56a assigned to two call processing devices 3'a and 3'b, respectively, as the input ATM line and with the ATM line 54e belonging to the line group 56b as the output ATM line, a call set-up continuation message and exchange of replies thereof become required between the call processing devices 3'a and 3'b.

In the present embodiment, the message switching is made by means of a VC among call processing devices. The fourth entry of a connection correspondence table 331 (FIG. 30) shows the set-up of a VC for such a purpose. From the processing device 3'a, a call set-up continuation message and a reply thereof are transmitted to and received from the call processing device 3'b by using a VC having a VPI/VCI value of q/r. Further, it is realized from the fourth entry of a VC routing table 571" (FIG. 31) of a line interface 55g that the call set-up message is transmitted to the call processing device 3'b connected to the line number #2 as a VC having a VPI/VCI value of q'/r'. According to an ATM switching system of the present embodiment, for example, call processing using a normal ATM terminal can be performed.

In an ATM switching system of the present embodiment, it is also possible to draw up a copy of a call administration table and perform fault recovery and dynamic load sharing similarly to the first embodiment. However, the switching of the communication routing at this time is made by transmitting a switch control message to the switch control portion and by the switch control portion performing the set-up of a VC routing table of each line interface portion and the set-up of a connection administration table of each call processing portion through a bus on the basis of the switch control message.

<The Fifth Embodiment>

In an ATM switching system provided with a call processing device installed externally to an ATM switching device such as the fourth embodiment for performing call processing, switching processing by means of a structure of two or more ATM switching devices and one call processing device is also possible.

Figure 34:
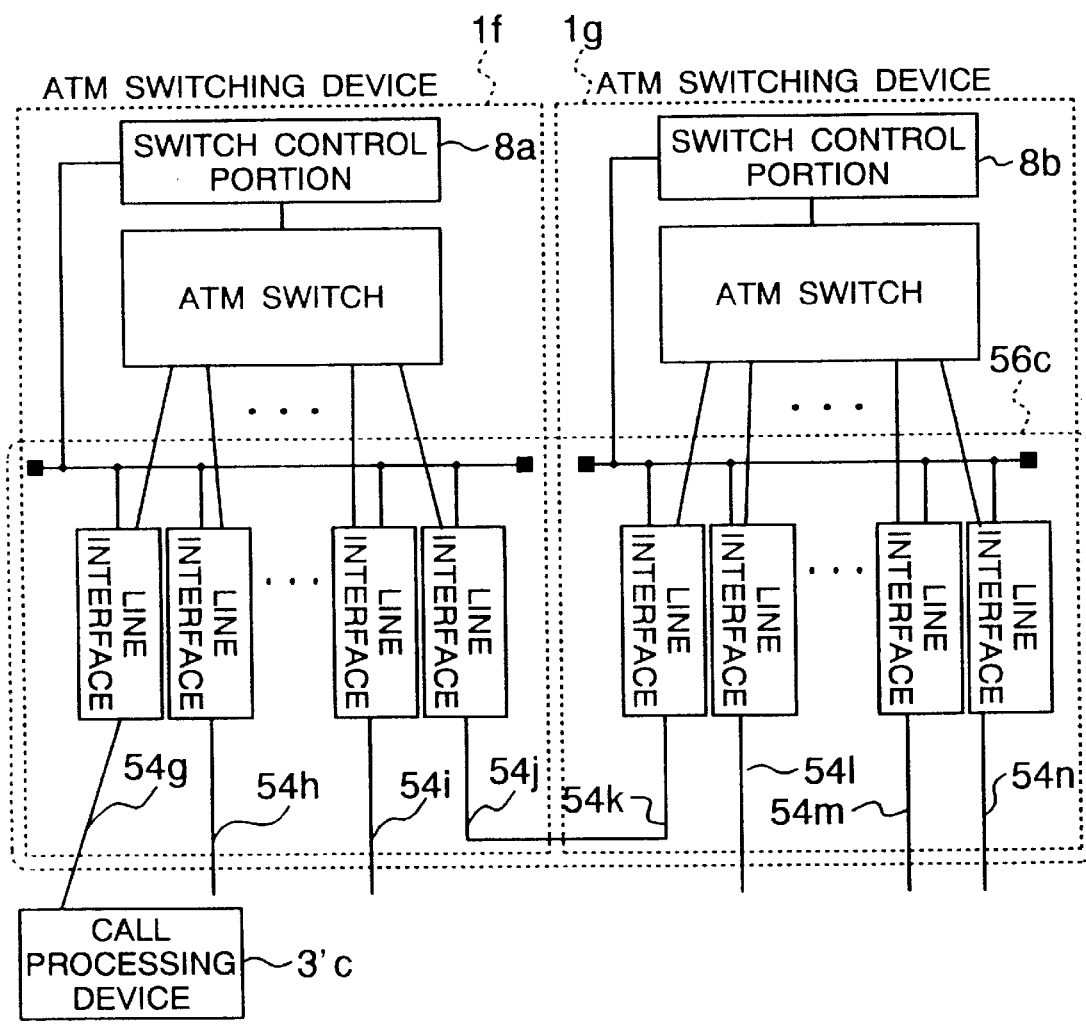
FIG. 34 is a block diagram showing another structure of an ATM switching system according to the present invention.

FIG. 34 is a block diagram showing another structural example of an ATM switching system of the present invention with two ATM switching devices if and 1g and one call processing device 3'c. Respective structures of the ATM switching devices 1f and 1g are the same as that of the above-mentioned ATM switching device, but the ATM line 54g of the ATM switching device 1f and the ATM line 54f of the ATM switching device 1g are connected with each other, and one call processing device 3'c is connected to an optional ATM line (54i here). Signaling messages transmitted and received to and from the ATM lines 54h to 54i and 54l to 54n are all transmitted and received by the call processing device 3'c so as to perform call processing using a VC to the call processing device 3'c from respective ATM lines. In a word, all the ATM lines 54g to 54i and 54l to 54m are formed in the same line group 56c. The control of the ATM switching devices 1f and 1g is made by transmitting a call control message using a VC between the call processing device 3'c and the switch control portions 8a and 8b so that the switch control portion 8a controls the ATM switching device 1f and the switch control portion 8b controls the ATM switching device 1g. Thus, according to the present embodiment, it is possible to provide an economical call processing function similar to that of the second embodiment.

Figure 46:
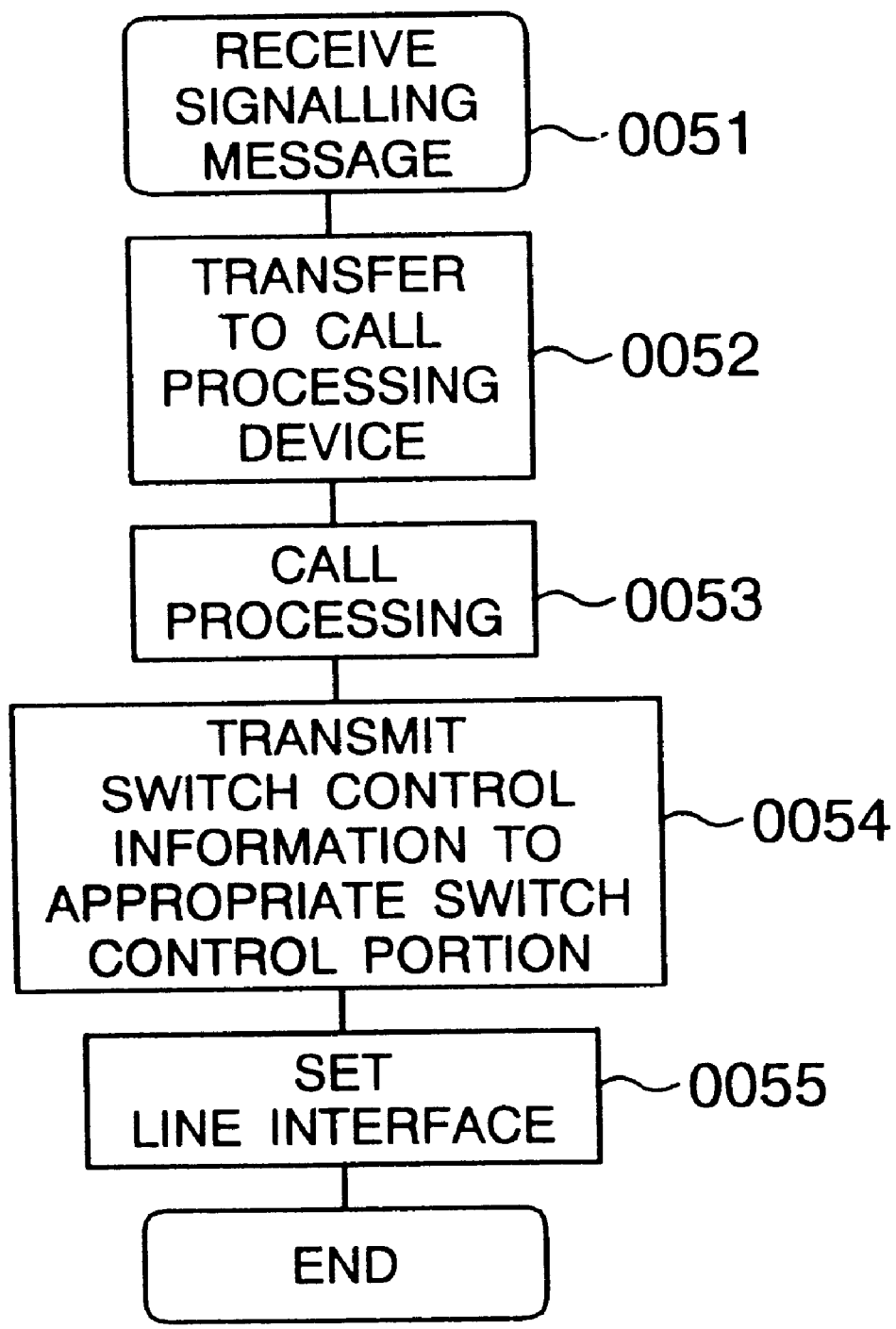
FIG. 46 is a chart showing a processing flow of the ATM switching system shown in FIG. 34.

FIG. 46 is a chart showing a rough sequence of call processing at a system level in the present embodiment. A signaling message which has arrived at a line interface from an ATM line (0051) is transferred to one call processing device provided within the system through the ATM switch in accordance with an entry of a VC routing table of a line interface (0052). The call processing device performs call processing (0053), transmits a switch control message to an input ATM line and a switch control portion of an ATM switching device to which an input ATM line and an output ATM line belong through an ATM switch (0054), and the switch control portion sets a VC routing table of a line interface through a bus on the basis of the switch control message, thereby to set the VC (0055).

<The Sixth Embodiment>

Figure 35:
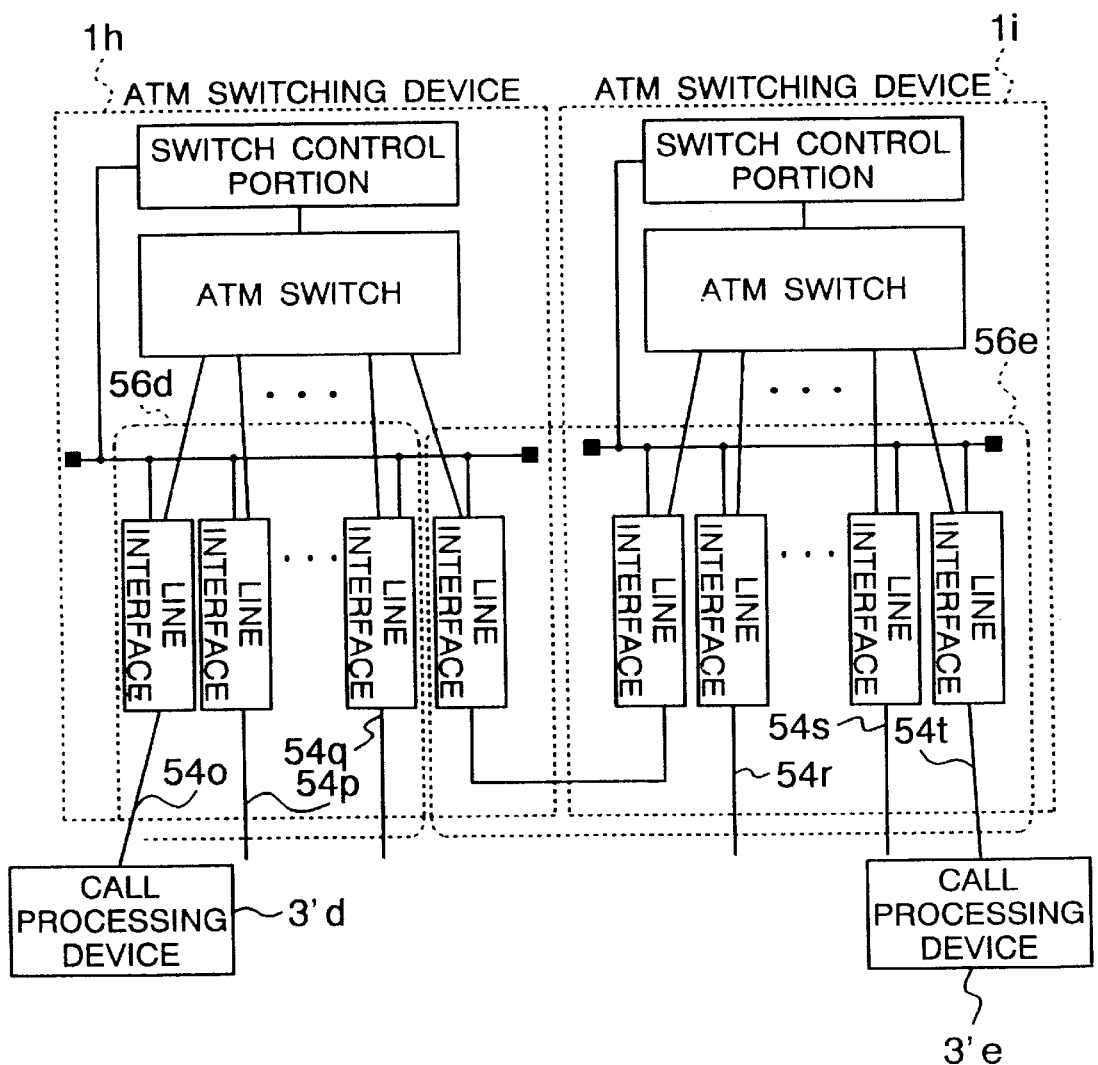
FIG. 35 is a block diagram showing another structure of an ATM switching system according to the present invention.

As the ATM switching system of the present invention, it is also possible to adopt a structure by a plurality of ATM switching devices and a plurality of call processing devices obtained by combining the previous fourth embodiment with the fifth embodiment. FIG. 35 is a block diagram showing another structure of an ATM switching system according to the present invention. Here, an example of an ATM switching system with two ATM switching devices 1h and 1i and two call processing devices 3'd and 3'e. The call processing devices 3'd and 3'e can be connected to an optional ATM line, but the call processing device 3'd is connected to an ATM line 54o of the ATM switching device 1h and the call processing device 3'e is connected to an ATM line 54t of the ATM switching device 1i here. Further, 3'd performs call processing related to the line group 56d and 3'e performs call processing related to the line group 56e. According to the present embodiment, it is possible to structure a flexible network system similar to the third embodiment.

Figure 47:
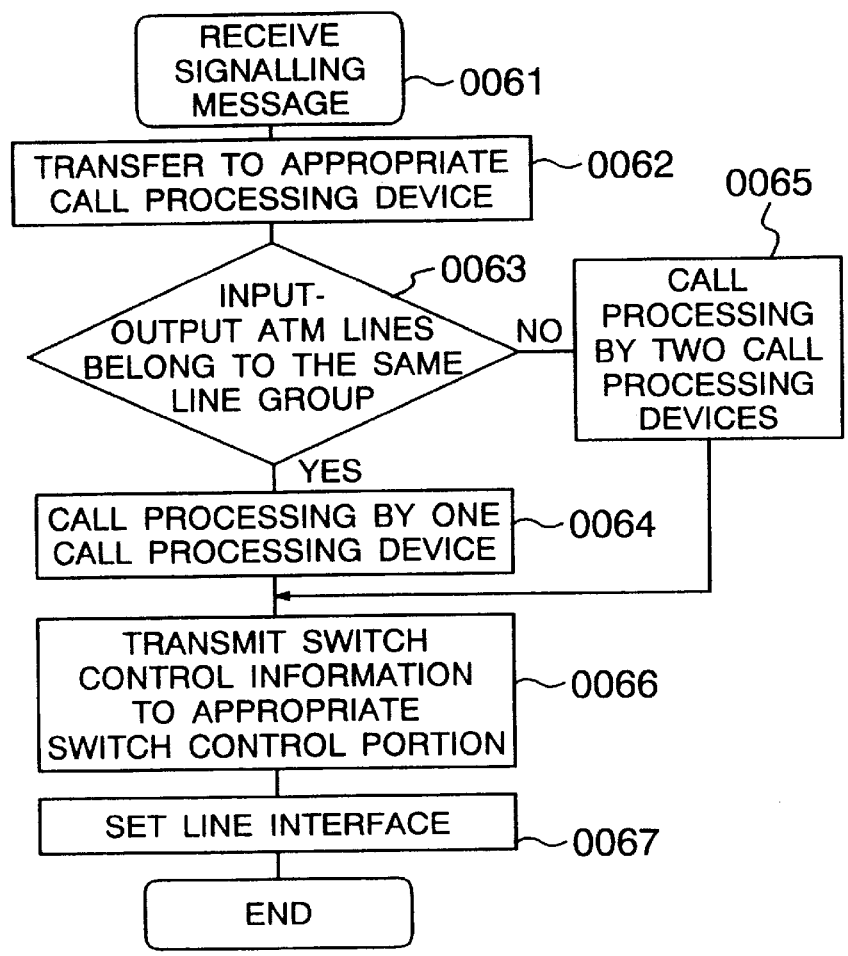
FIG. 47 is a chart showing a processing flow of the ATM switching system shown in FIG. 35.

FIG. 47 is a chart showing a rough sequence of call processing at a system level in the present embodiment. A signaling message which has arrived at a line interface from the ATM line (0061) is transferred to a call processing device to which a line group to which the line belongs is assigned through the ATM switch (0062) in accordance with an entry of a VC routing table of the line interface. In the call processing device, when the input ATM line and the output ATM line belong to the same line group, the corresponding call processing device performs processing independently of the other call processing devices (0063, 0064), and, when the input ATM line and the output ATM line belong to different line groups, the corresponding processing device performs processing in cooperation with another call processing device to which a line group to which the output ATM line belongs is assigned through the ATM switch (0063, 0065). Then, a switch control message is transmitted to a switch control portion of an ATM switching device to which the input ATM line and the output ATM line belong through an ATM switch (0066), and the switch control portion sets a VC routing table of a line interface through a bus on the basis of the switch control message, thereby to set the VC (0067).

Figure 48:
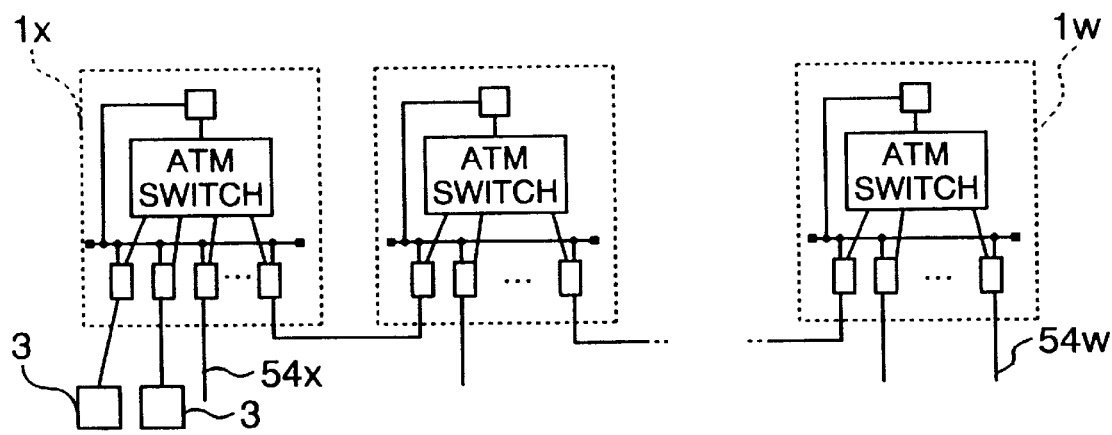
FIG. 48 is a diagram showing another embodiment of the ATM switching system shown in FIG. 35.

When an ATM switching system of the present invention is structured with three and more ATM switching devices, the other plurality of ATM switching devices for performing transit are in existence sometimes between an ATM switching device 1x to which an input ATM line 54x belongs and an ATM switching device 1w to which an output ATM line 54w belongs as shown in FIG. 48. In this case, the call processing device transmits a switch control message to a switch control portion of an ATM switching device for performing transit, and the switch control portion sets a VC routing table of a line interface of a transit switch through a bus on the basis of a switch control message, thereby to set a VC from the input ATM line to the output ATM line.

<The Seventh Embodiment>

In the above-mentioned various embodiments of the present invention, a sharing system of a call processing function which is one of the functions of the ATM switching system has been shown. The ATM switching system, however, has a switch administration function for switching Operation, Administration and Maintenance (OAM) cells, a routing function for switching information within the network so as to draw up a routing table and so on other than the above, and in addition, various service functions such as a connectionless communication server function sometimes. In the present embodiment, a function split system for splitting these functions in a plurality of processing devices (processors) is shown. The present embodiment also has a structure almost the same as that shown in FIG. 1. An example in which the switch administration function is allocated to the call processing device 3a and the call processing function and the routing function are allocated to the call processing device 3b will be described hereinafter (hereinafter 3a and 3b are referred to as various processing devices).

In the present embodiment, the switch control portion 4 shown in FIG. 1 is different from the previous embodiments (which is referred to as 4'). This is because of such a reason that, as against that description limited to the call processing function has been made in the previous embodiment, it is required to distribute the messages to various processing devices and to perform extraction and multiplexing of an OAM cell transmitted and received while being included in a VC used by these functions. The finite difference thereof will be described hereinafter. Besides, the message format on the call control message communication line 41 is similar to those shown in FIG. 9 to FIG. 12.

Figure 36:
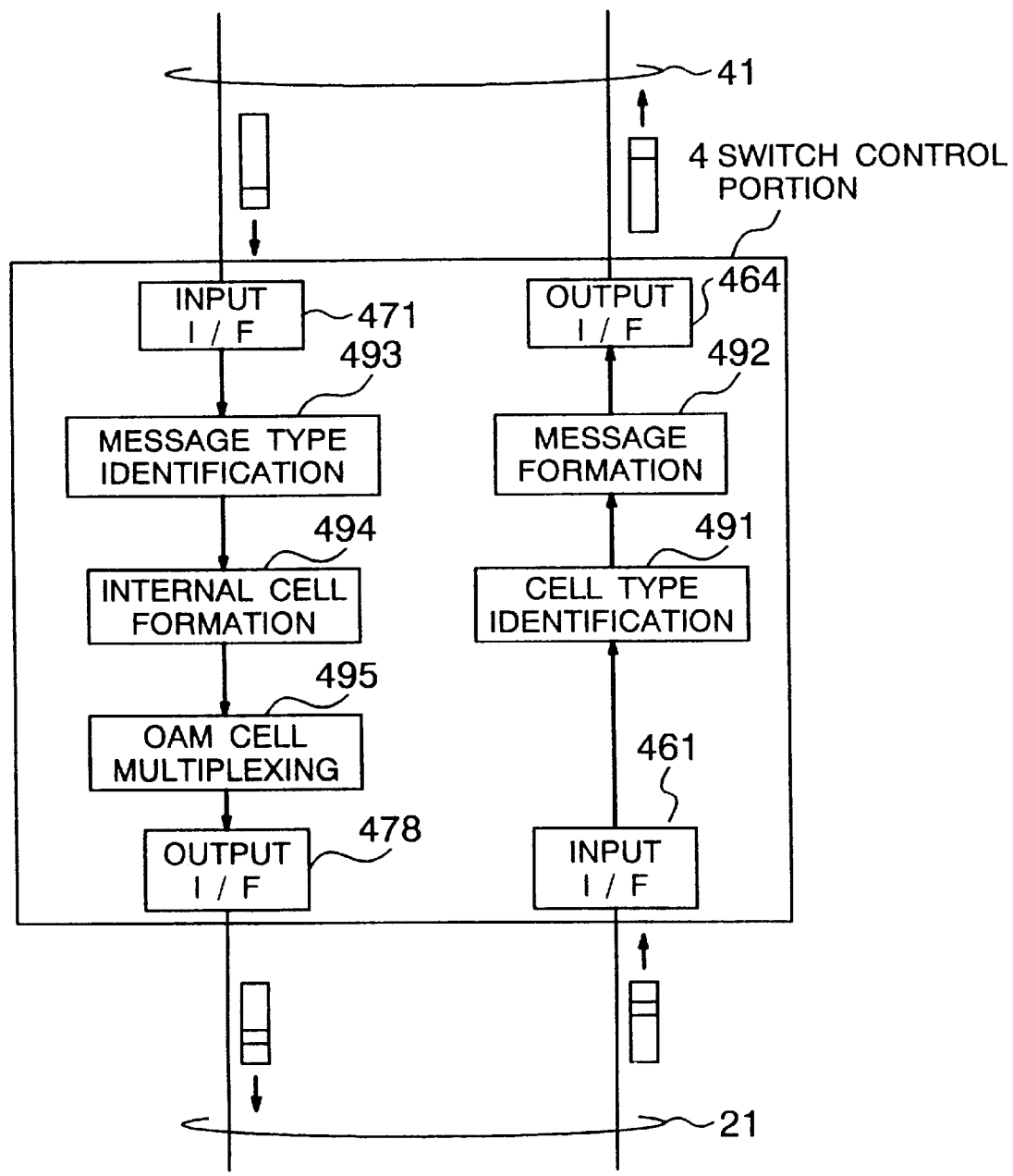
FIG. 36 is a block diagram showing a structure of a switch control portion according to the present invention.
Figure 37:
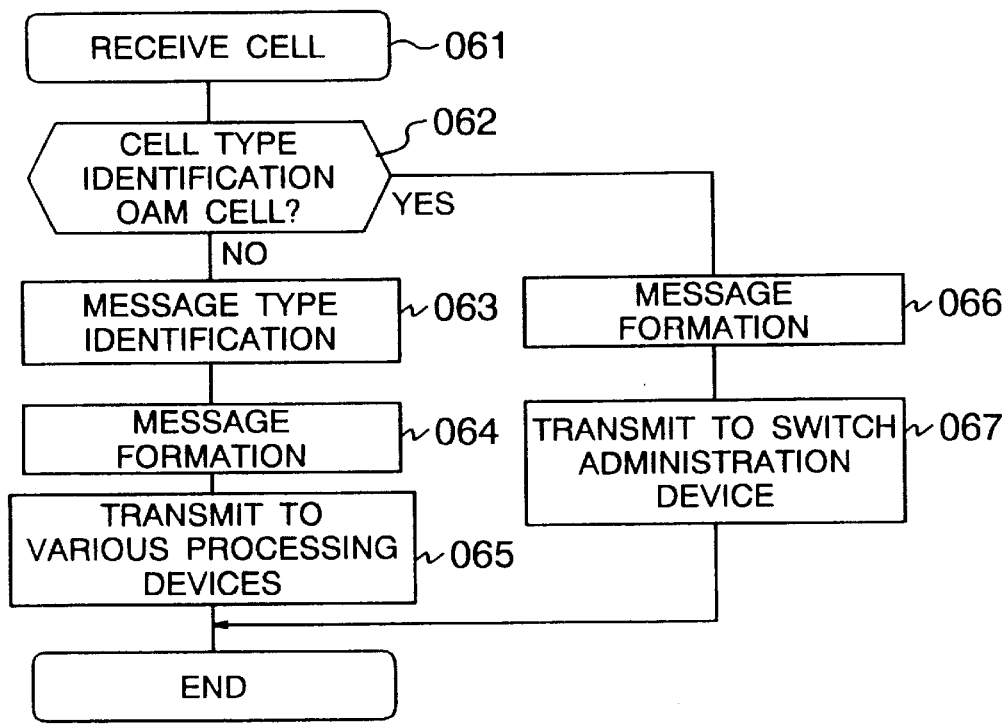
FIG. 37 is a processing flow chart showing the operation of the switch control portion.
Figure 38:
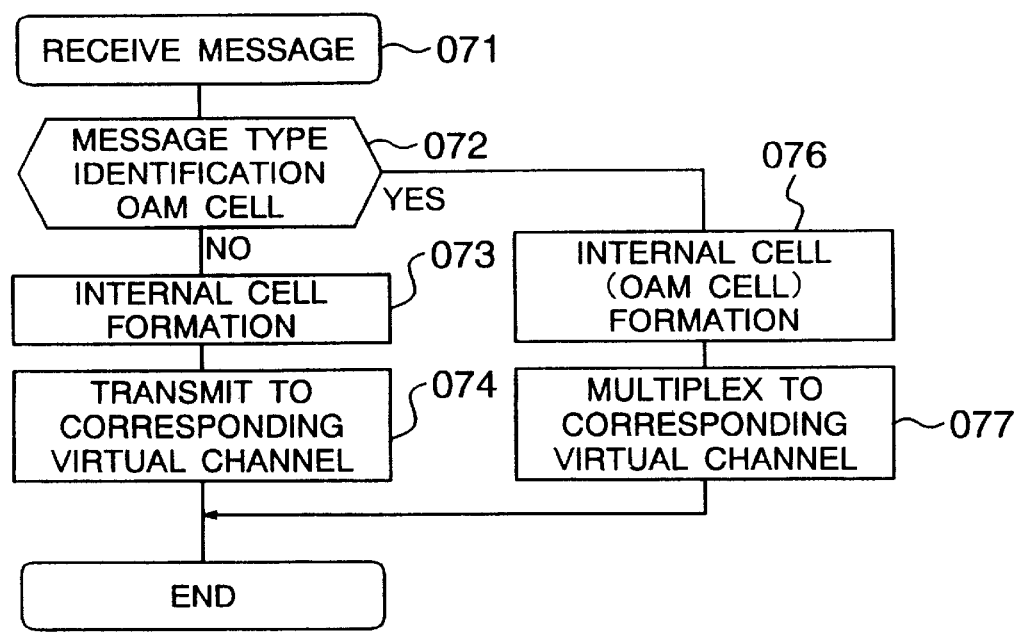
FIG. 38 is a processing flow chart showing the operation of the switch control portion.

FIG. 36 is a block diagram showing a structure of the switch control portion 4' used in the ATM switching system of the present invention. Further, FIGS. 37 and 38 are processing flow charts showing the operation of the switch control portion 4', in which FIG. 37 shows a processing flow until a cell received from the switch portion is transmitted to various processing devices and FIG. 38 shows a processing flow until a message from various processing devices is formed into a cell and transmitted to an internal input-output line.

First, the processing operation until a cell received from the switch portion is transmitted to various processing devices is described with reference to FIG. 36 and FIG. 37.

The switch control portion 4' which has received an internal cell (061) from the internal input-output line 21 through an input I/F 461 identifies the type of the cell by a cell type identifying portion 491 (062). In a message forming portion 492, when the cell is an OAM cell, the cell is transmitted to a switch administration device (067) as a message of a format depending on the call control message communication line 41 (066). When the cell is the other type of cell, the message type is identified (063) and the cell is formed into a message (064) and transmitted thereafter to an appropriate processing device (065). For example, when the message is a signaling message (requirement information related to call processing), it is transmitted to a corresponding call processing device. When the message is information related to a routing function, the message is transmitted to a processing device having a routing function.

Next, the processing operation until the message from various processing devices is formed into a cell and transmitted to the internal input-output line is described with reference to FIG. 36 and FIG. 38.

The switch control portion 4' which has received a message through an input I/F 471 (071) identifies the message type in a message type identifying portion 493 (072) and converts the message into an internal cell in an internal cell forming portion 494 (073), and transmits the OAM cell thereafter through an output I/F 478 (074). When the message type is identified, however, the OAM cell is multiplexed with a cell forming the other message in an OAM cell multiplexing portion and transmitted (077) after the VC to be transmitted is identified and formed into an OAM cell (076).

According to the present embodiment, it is also possible to concentrate maintenance, operation and administration function such as processing of an OAM cell to one processing device and to allocate processors by various functions when various processing devices are added sequentially.

<The Eighth Embodiment>

In the structure of the fourth embodiment (FIG. 27), it is also possible to perform function splitting similar to the above-mentioned seventh embodiment. For example, in the structure shown in FIG. 27, it is conceivable to allocate the switch administration function to the call processing device 3'a and to allocate the call processing function and the routing function to the call processing function 3'b (hereinafter 3'a and 3'b are referred to as various processing devices).

Figure 39:
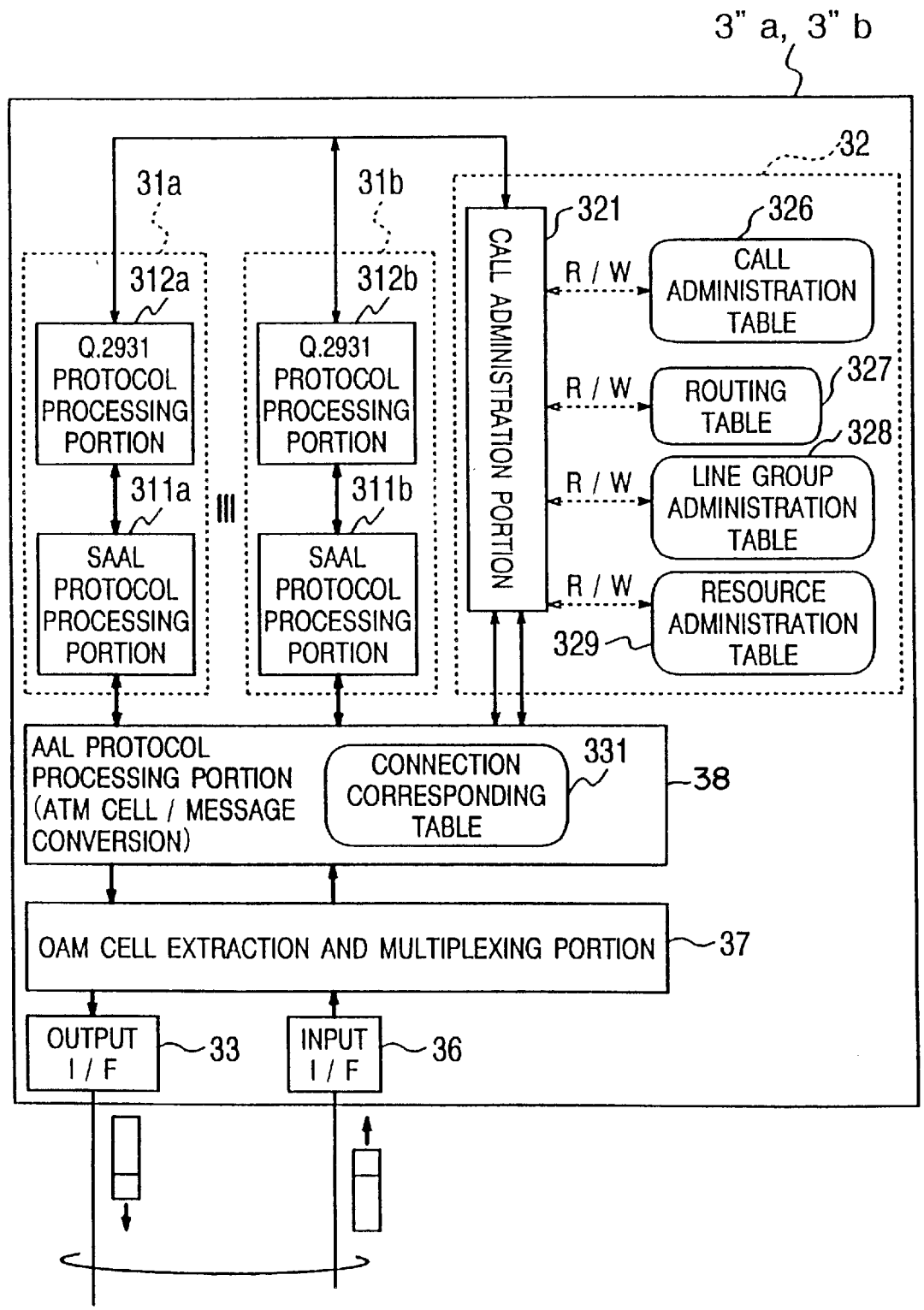
FIG. 39 is a block diagram showing another structure of a switch control portion according to the present invention.

FIG. 39 is a block diagram showing another structural example of a call processing device used in an ATM switching system of the present invention. The present call processing devices 3"a and 3"b differ from the previous embodiment in a fact that an OAM cell extraction and multiplexing portion 37 for extraction and multiplexing of an OAM cell is provided among the input I/F 33, the output I/F 36 and the AAL protocol processing portion 38 in the call processing portion (various processing devices) 3'a and 3'b shown in FIG. 27. An example having call processing functions (31, 32, 38) is shown in FIG. 39, but various processing devices are structured by replacing this function with the switch administration function or the routing function.

The function of the OAM cell extraction and multiplexing portion 37 differs depending on whether the processing device having the function is a switch administration device or not. In the case of a switch administration device, the OAM cell is extracted and delivered to the switch administration function portion. On the other hand, the other cells are transferred to an appropriate processing device through the ATM switch portion. In the case of other than the switch administration device, the extracted OAM cell is transferred to the switch administration device, and other cells than the extracted OAM cell are delivered to the AAL protocol processing portion.

Figure 40:
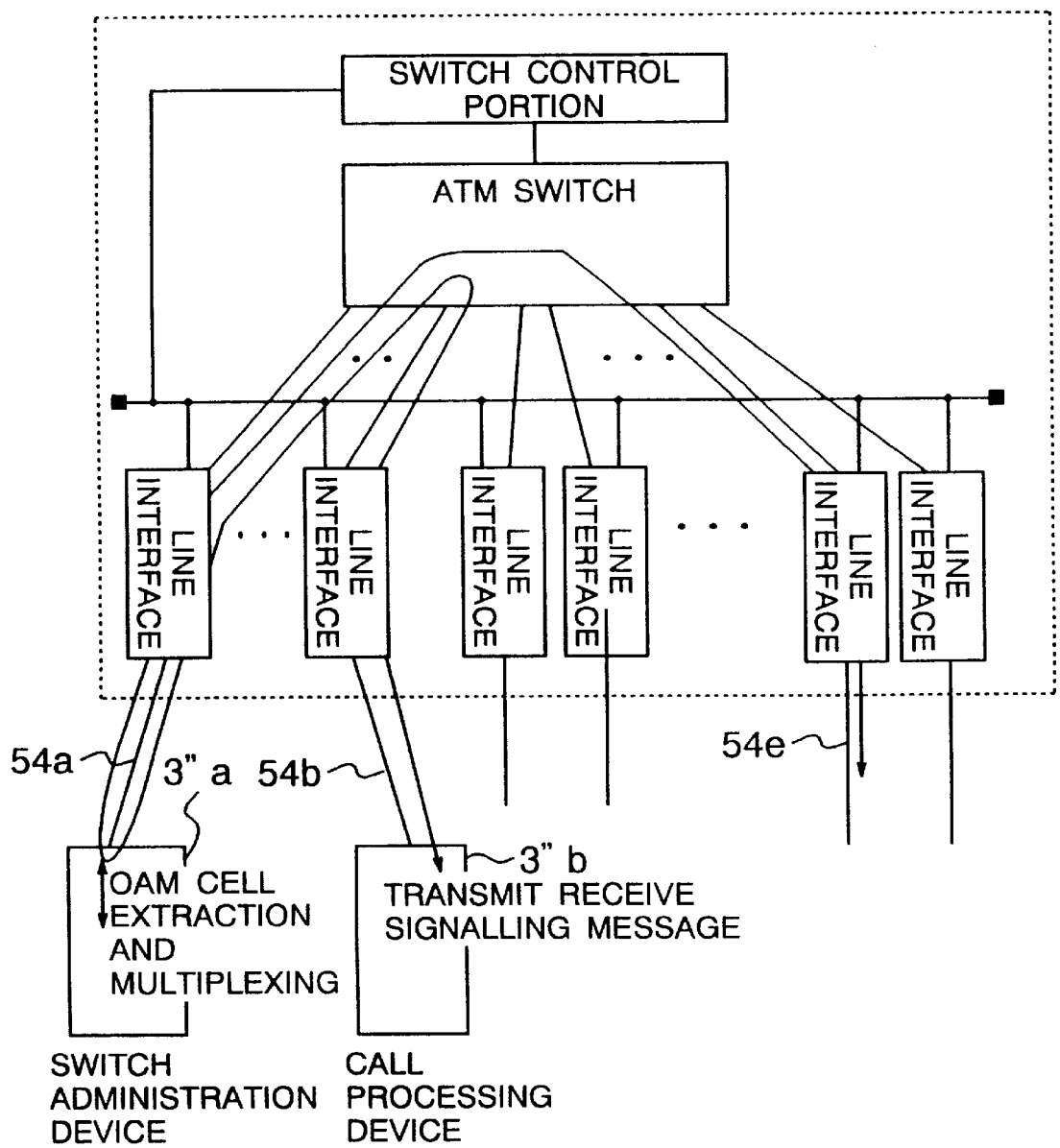
FIG. 40 is an operation explanatory diagram showing a flow of an OAM cell in a call processing device according to the present invention.

FIG. 40 is an operation explanatory diagram showing the flow of cells in case OAM cells are flowing on a signaling VC assuming the call processing device 3"a to be a switch administration device and the call processing device 3"b to be a call processing device. A cell transmitted and received by a signaling VC of an ATM line 54e is not applied with VC routing directly to the call processing device 3"b as shown in the fourth embodiment, but goes through the switch administration device 3"a once. In the OAM cell extraction and multiplexing portion of the switch administration device, the OAM cell is extracted from the received cell and delivered to the switch administration function portion, and the cells other than the extracted OAM cell are transferred to the call processing device 3"b. The cell transmitted from the call processing device 3"b also goes through the switch administration device 3"a once, and the OAM cell issued by the switch administration device 3"a is multiplexed here. Further, it is also possible to perform extraction and multiplexing of the OAM cell by the line interface portion for all the cells without through the switch administration portion. The arrow mark in the figures shows bidirectional communication. The cell transmitted and received by the routing VC of the ATM line performs extraction and multiplexing of the OAM cell by going through the switch administration device once. According to the present embodiment, it is possible to allocate processors by various functions similarly to the seventh embodiment.

We claim:

1. An ATM switching system comprising;

a plurality of call processing devices;

a plurality of line interfaces for inputting and outputting an ATM cell, said plurality of line interfaces being grouped into at least one line group;

an ATM switch connected to said plurality of line interfaces for exchanging the ATM cell; and switch control means connected to said ATM switch, said plurality of line interfaces and said plurality of call processing devices, said switching control means comprises:

distribution means for determining to which of said plurality of call processing devices requirement information related to call processing of a call input from said line interfaces is to be distributed, and means for transmitting control information from at least one of said call processing devices selected by said distribution means directly to a related line interface through a bus.

2. An ATM switching system according to claim 1, wherein each of said plurality of line interfaces includes means for transmitting requirement information related to call processing to said switch control means through a bus.

3. An ATM switching system according to claim 1, wherein each of said plurality of line interfaces includes means for transmitting requirement information related to call processing to said switch control means by a virtual channel through said ATM switch.

4. An ATM switching system according to claim 1, wherein said switch control means and each of said plurality of call processing devices include means for storing line group administrative information corresponding to said line groups, and said distribution means includes means for determine to which of said plurality of call processing devices said requirement information is to be distributed based on said line group administrative information.

5. An ATM switching system according to claim 4, wherein said distribution means includes means for selecting, when input-output lines for performing call setting belong to a same line group, a call processing device corresponding to said same line group and selecting, when the input-output lines for performing call setting belong to different line groups, two call processing devices corresponding to respective line groups of said different line groups.

6. An ATM switching system according to claim 4, further comprising means for altering said line group administrative information in accordance with the state of processing ability of said plurality of call processing devices.

7. An ATM switching system according to claim 6, wherein each of said plurality of call processing devices includes means for generating and holding duplicates of administrative information including at least call administrative information, routing information and resource information related to call processing executed by another call processing device, and said ATM switching system further comprising:

means, when a fault occurs in a first call processing device among said plurality of call processing devices, for updating said line group administrative information of said call processing device other than said first processing device and said switch control means;

means for switching a communication routing from said switch control means to said first call processing device to a second call processing device succeeding call processing of said first call processing device; and means for setting a communication routing between said first call processing device and another call processing device between said second call processing device and another call processing device except said first call processing device.

8. An ATM switching system according to claim 6, wherein each of said plurality of call processing devices includes means for generating and holding duplicates of administrative information including at least call administrative information, routing information and resource information related to call processing executed by another call processing device; and said ATM switching system further comprising means, when a first call processing device among said plurality of call processing devices shows an overload state, for transferring the control of a part of call processing processed by said first call processing device to another call processing device in the line unit.

9. An ATM switching system according to claim 1, further comprising means for altering a distribution rule for distributing said requirement information in accordance with the state of processing ability of said plurality of call processing devices.

10. An ATM switching system according to claim 1, wherein said switch control means includes means for determining said corresponding call processing device in accordance with the type of a message inputted through said plurality of line interfaces.

11. An ATM switching system according to claim 10, wherein said message includes at least any of requirement information, routing information and a maintenance, operation and information cell related to call processing.

12. An ATM switching system according to claim 11, wherein at least one of said plurality of call processing devices includes a system administration device for processing a maintenance, operation and administrative information cell of said ATM switching system, and said switch control means comprises:

means for extracting a maintenance, operation and administrative information cell inputted from said plurality of line interfaces;

means for transferring said extracted maintenance, operation and administrative information cell to said system administration device; and means for multiplexing said maintenance, operation and administrative information cell from said system administration device to the information outputted to said plurality of line interfaces.

13. A communication method of an ATM switching system according to claim 1, comprising the steps of:

transmitting requirement information related to call processing of a received ATM cell to said switch control means;

determining at least one call processing device for transmitting said requirement information based on a prescribed distribution rule in said switch control means;

performing call processing in said determined call processing device; and setting related line interface to said received ATM cell based on the control information from said determined call processing device.

14. A communication method according to claim 13, wherein the step of transmitting said requirement information to said switch control means includes a step of transmitting the requirement information directly to said switch control means through a bus.

15. A communication method according to claim 13, wherein the step of transmitting said requirement information to said switch control means includes a step of transmitting the requirement information by a virtual channel through said ATM switch.

16. A communication method according to claim 13, wherein the step for determining said call processing device includes, when the input-output lines of a received cell belong to the same line group A, a step of selecting one call processing device A corresponding to said line group A, and includes, when the input-output lines belong to different line groups A and B, a step of selecting two call processing devices A and B corresponding to said line groups A and B.

17. A communication method according to claim 13, further comprising a step of altering a distribution rule for distributing said requirement information in accordance with the state of processing capability of said plurality of call processing devices.

18. A communication method according to claim 17, wherein, when a fault occurs in a first call processing device among said plurality of call processing devices, said communication method further comprising the steps of:
transferring the control of information related to call processing which has belonged to said first call processing device to a second call processing device for performing call processing in place of said first call processing device;
altering communication routings among said call processing devices and between said call processing device and said switch control means; and
altering said distribution rule conforming to a new processing state of the call processing device.

19. A communication method according to claim 17, wherein a step of transferring the control of information related to said call processing includes a step of generating duplicates of call administrative information, routing information and resource information related to call processing with said second call processing device.

20. A communication method according to claim 17, wherein, when a first call processing device among said plurality of call processing devices shows an overload state, said communication method further comprising the steps of:
transferring the control of a part of call processing processed by said first call processing device to another call processing device in the line unit;
altering communication routings among said call processing devices and between said call processing device and said switch control means with said transfer of control; and
altering said distribution rule conforming to a new processing state of the call processing device.

21. A communication method according to claim 20, wherein a step of transferring the control of a part of said call processing to another call processing device includes a step of generating duplicates of administrative information including call administrative information, routing information and resource information related to call processing the control of which is transferred in said another call processing device.

22. A communication method according to claim 13, wherein a step of determining said call processing device includes a step of determining a corresponding call processing device in accordance with the type of a message inputted through said plurality of line interfaces.

23. A communication method according to claim 22, wherein a step of determining said call processing device includes a step of determining a corresponding call processing device depending on which of the requirement information related to call processing, routing information and maintenance, operation and administrative information cell said message is.

24. A communication method according to claim 23, further comprising, when at least one of said plurality of call processing devices includes a system administration device for processing a maintenance, operation and administrative information cell of said ATM switching system, the steps of, in said switch control means:
extracting a maintenance, operation and administrative information cell inputted from said plurality of line interfaces;
transferring extracted said maintenance, operation and administrative information cell to said system administration device; and
multiplexing said maintenance, operation and administrative information cell from said system administration device to the information outputted to said plurality of line interfaces.

25. An ATM switching system comprising:
at least one call processing device;
a plurality of ATM switching devices, each of said ATM switching devices being grouped into a plurality of line interfaces for inputting and outputting ATM cells and said plurality of line interfaces being grouped into at least one line group;
an ATM switch connected to said plurality of line interfaces for exchanging ATM cells;
switch control means connected to said ATM switch, said plurality of line interfaces and said at least one call processing device, said switch control means comprises:
distribution means for determining to which of said call processing devices requirement information related to call processing input from said line interfaces is to be distributed, and
means for transmitting control information from at least one of said at least one call processing devices selected by said distribution means directly to related line interfaces through a bus; and
means for transiting among said plurality of ATM switching devices through line interfaces.

26. An ATM switching system according to claim 25, wherein each of said plurality of line interfaces includes means for transmitting requirement information related to call processing directly to said switch control means through a bus.

27. An ATM switching system according to claim 25, wherein each of said plurality of line interfaces includes means for transmitting requirement information related to call processing to said switch control means by a virtual channel through said ATM switch.

28. An ATM switching system according to claim 25, wherein said switch control means and each of said plurality of call processing devices include means for storing line group administrative information corresponding to said line groups, and said distribution means includes means for determining to which of said plurality of call processing devices said requirement information is to be distributed based on said line group administrative information.

29. A communication method in an ATM switching system according to claim 25, further comprising the steps of:
- transmitting requirement information related to call processing of a received ATM cell to said switch control means;
- determining at least one call processing device for transmitting said requirement information based on a predetermined distribution rule in said switch control means;
- performing call processing with said determined call processing device; and
- setting a line interface related to said received ATM cell based on control information from said determined call processing device.

30. A communication method according to claim 29, wherein a step of transmitting said requirement information to said switch control means includes a step of transmitting the requirement information directly to said switch control means through a bus.

31. A communication method according to claim 29, wherein a step of transmitting said requirement information to said switch control means includes a step of transmitting the requirement information by a virtual channel through said ATM switch.

32. A communication method according to claim 29, wherein a step of determining said call processing device includes a step of, when the input-output line of the received cell belongs to the same line group A, selecting one call processing device A corresponding to said line group A, and includes a step of, when the input-output line belongs to different line groups A and B, selecting two call processing devices A and B corresponding to said line groups A and B.

33. A communication method according to claim 29, further comprising a step of altering a distribution rule for distributing said requirement information in accordance with the state of processing capacity of said plurality of call processing devices.

34. An ATM switching system comprising:
- a plurality of call processing devices each being connected to separate line interface A, each of said plurality of call processing devices transmitting and receiving requirement information and control information related to call processing through said line interface A and the ATM switch;
- a plurality of line interfaces B for inputting and outputting an ATM, said line interfaces B being grouped into at least one line group, each of said plurality of line interfaces B including a virtual channel routing table for transmitting requirement information related to call processing to corresponding call processing device;
- an ATM switch connected to said plurality of line interfaces A and B for switching ATM cells; and
- switch control means connected to said ATM switch and said plurality of line interfaces A and B for setting a virtual channel routing table of the related line interfaces through a bus based on control information from the call processing device.

35. An ATM switching system according to claim 34, wherein said virtual channel routing table includes data showing a correspondence relationship between said line group and said call processing device.

36. An ATM switching system according to claim 34, wherein at least one of said plurality of call processing devices includes a system administration device for processing the maintenance, operation and administrative information cell of said ATM switching system, said system administration device including:
- means for extracting the maintenance, operation and administrative information cell inputted from said plurality of line interfaces B; and
- means for multiplexing said maintenance, operation and administration cell to information outputted to said plurality of line interfaces B.

37. A communication method of an ATM switching system according to claim 34, comprising the steps of:
- transmitting requirement information related to call processing of a received ATM cell to a corresponding call processing device through said ATM switch based on a virtual routing table of said line interface;
- when an input line and an output line of said received ATM cell belong to the same line group, corresponding one call processing device performs call processing independently of the other call processing devices, and, when the input line and the output line belong to different line groups, corresponding two call processing devices perform call processing in cooperation with each other through said ATM switch; and
- setting a virtual routing table of line interface related to said received ATM cell based on control information from said corresponding one or two call processing devices.

38. A communication method according to claim 37, further comprising the steps of, when at least one of said plurality of call processing devices includes a system administration device for processing a maintenance, operation and administrative information cell of said ATM switching system:
- extracting a maintenance, operation and administrative information cell inputted from said plurality of line interfaces B; and
- multiplexing said maintenance, operation and administrative information cell to the information outputted to said plurality of line interfaces B.

39. An ATM switching device comprising:
- a plurality of ATM switching devices;
- at least one call processing device connected to said plurality of ATM switching devices through separate line interfaces A, respectively, said call processing device transmitting and receiving requirement information and control information related to call processing through an ATM switch in an ATM switching device connected to said line interface A; and
- means for connected among said plurality of ATM switching devices through line interfaces;
- wherein each of said plurality of ATM switching devices includes:
  - a plurality of line interfaces B for inputting and outputting ATM cells, each of said plurality of line interfaces B including a virtual channel routing table for transmitting requirement information related to call processing to the corresponding call processing device,
  - an ATM switch connected to said plurality of line interfaces A and B for switching the ATM cells, and switch control means connected to said ATM switch and said plurality of line interfaces A and B for setting a virtual channel routing table of the related line interface through a bus based on control information from the call processing device, said plurality of line interfaces A and B being grouped into at least one line group.

40. An ATM switching system according to claim 39, wherein said virtual channel routing table includes data showing correspondence relationship between said line group and said call processing device.

41. A communication method of an ATM switching system according to claim 39, further comprising the steps of:

transmitting requirement information related to call processing of a received ATM cell to a corresponding call processing device through said ATM switch based on a virtual routing table provided in said line interfaces;

when an input line and an output line of said received ATM cell belong to the same line group, corresponding one call processing device performs call processing independently of the other call processing devices, and, when the input line and the output line belong to different line groups, corresponding two call processing devices perform call processing in cooperation with each other through said ATM switch; and setting a virtual routing table of line interfaces related to said received ATM cell based on control information from said corresponding one or two call processing devices.

42. A communication method according to claim 41, further comprising the steps of, when at least one of said plurality of call processing devices includes a system administration device for processing a maintenance, operation and administrative information cell of said ATM switching system:

extracting a maintenance, operation and administrative information cell inputted from said plurality of line interfaces B; and multiplexing said maintenance, operation and administrative information cell to the information outputted to said plurality of line interfaces B.

* * * * *